US012675866B2

(12) United States Patent
Chen et al.

(10) Patent No.: US 12,675,866 B2
(45) Date of Patent: Jul. 7, 2026

(54) METHOD AND APPARATUS FOR INSPECTING A WAFER

(71) Applicant: Taiwan Semiconductor Manufacturing Company Limited, Hsin-Chu (TW)

(72) Inventors: Yi-Hsi Chen, Hsin-Chu (TW); Cheng-Hung Chen, Hsinchu County (TW); Chia Han Wu, Hsinchu County (TW); Yen-Chia Liu, Tainan City (TW); Hsu-Shui Liu, Pingjhen City (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 0 days.

(21) Appl. No.: 18/758,130

(22) Filed: Jun. 28, 2024

(65) Prior Publication Data

US 2026/0004414 A1    Jan. 1, 2026

(51) Int. Cl.
| | |
|---|---|
| *G06T 7/00* | (2017.01) |
| *G01N 21/95* | (2006.01) |
| *G06T 7/521* | (2017.01) |
| *H04N 23/56* | (2023.01) |

(52) U.S. Cl.
CPC ....... *G06T 7/0004* (2013.01); *G01N 21/9501* (2013.01); *G06T 7/521* (2017.01); *H04N 23/56* (2023.01); *G01N 2201/06113* (2013.01); *G01N 2201/0636* (2013.01); *G06T 2207/30148* (2013.01)

(58) Field of Classification Search
CPC .................. G06T 7/0004; G06T 7/521; G06T 2207/30148; G01N 21/9501; G01N 2201/06113; G01N 2201/0636; H04N 23/56
See application file for complete search history.

(56) References Cited

U.S. PATENT DOCUMENTS

| | | | | |
|---|---|---|---|---|
| 7,095,507 B1 * | 8/2006 | Hwang | .............. | G01B 11/2441 356/512 |
| 2004/0012775 A1 * | 1/2004 | Kinney | .............. | G01N 21/9501 356/237.2 |
| 2010/0141936 A1 * | 6/2010 | Aizawa | .............. | G01N 21/9501 356/237.2 |
| 2015/0211926 A1 * | 7/2015 | Robinson | .............. | G01J 3/0237 356/456 |
| 2015/0229094 A1 * | 8/2015 | Nagano | .................. | G02F 1/093 359/484.03 |
| 2019/0094150 A1 * | 3/2019 | Obata | ................ | G01N 21/8851 |
| 2022/0120698 A1 * | 4/2022 | Norman | .............. | G01N 23/083 |
| 2024/0144358 A1 * | 5/2024 | Hauk | .................... | H04N 23/66 |

* cited by examiner

*Primary Examiner* — Richard A Hansell, Jr.
(74) *Attorney, Agent, or Firm* — Cooper Legal Group, LLC

(57) ABSTRACT

A method includes generating coherent light that has a wavefront, shaping the wavefront of the coherent light to provide the coherent light with a shaped wavefront, directing a probe beam of the coherent light with the shaped wavefront to an inspection surface of a wafer, causing a reflection beam to be reflected from the inspection surface of the wafer, capturing an image formed from the reflection beam reflected from the inspection surface of the wafer and generating image data related to the image, and analyzing the image data to determine whether there is a defect in the inspection surface of the wafer.

20 Claims, 22 Drawing Sheets

1200

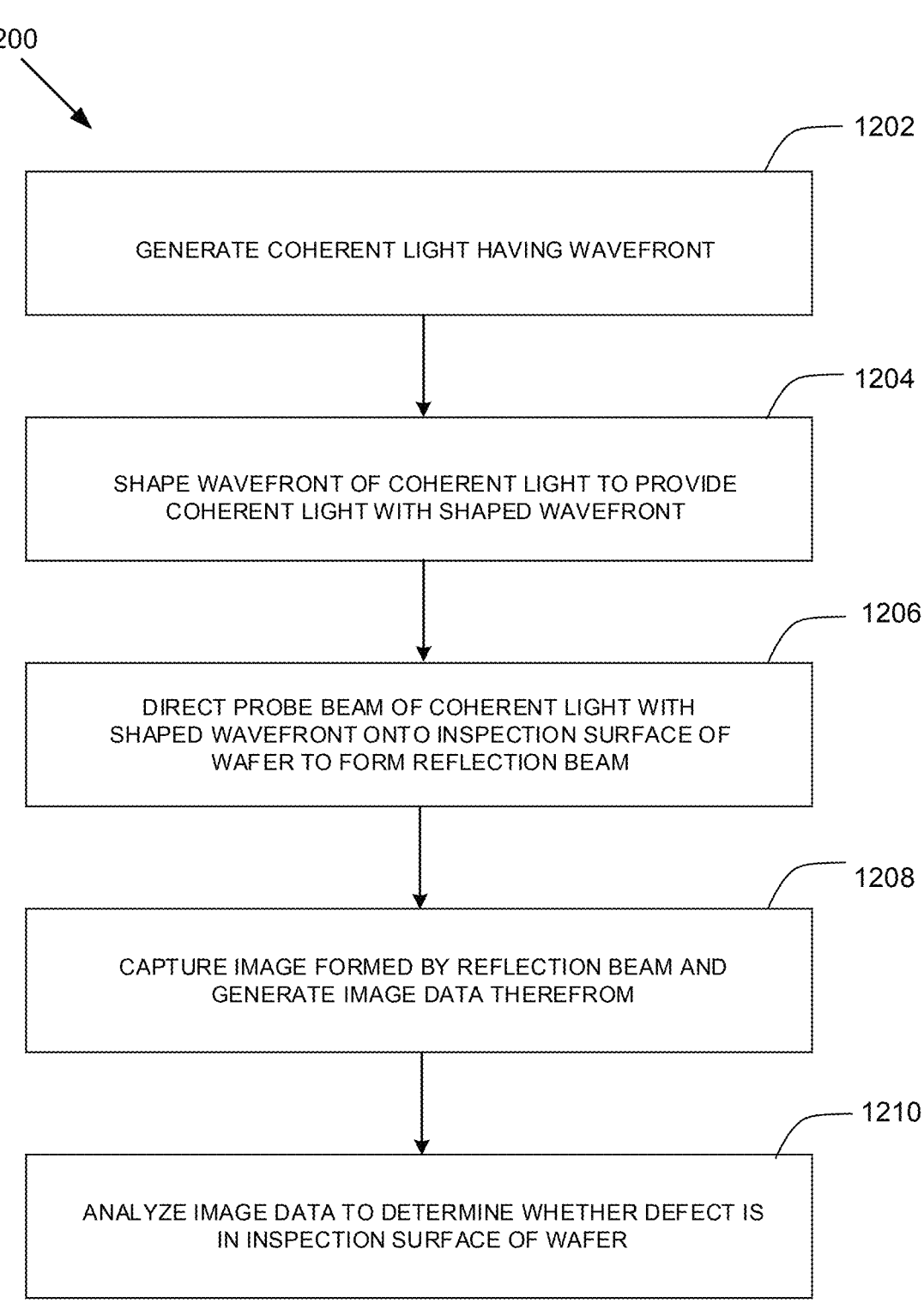

1202

GENERATE COHERENT LIGHT HAVING WAVEFRONT

1204

SHAPE WAVEFRONT OF COHERENT LIGHT TO PROVIDE
COHERENT LIGHT WITH SHAPED WAVEFRONT

1206

DIRECT PROBE BEAM OF COHERENT LIGHT WITH
SHAPED WAVEFRONT ONTO INSPECTION SURFACE OF
WAFER TO FORM REFLECTION BEAM

1208

CAPTURE IMAGE FORMED BY REFLECTION BEAM AND
GENERATE IMAGE DATA THEREFROM

1210

ANALYZE IMAGE DATA TO DETERMINE WHETHER DEFECT IS
IN INSPECTION SURFACE OF WAFER

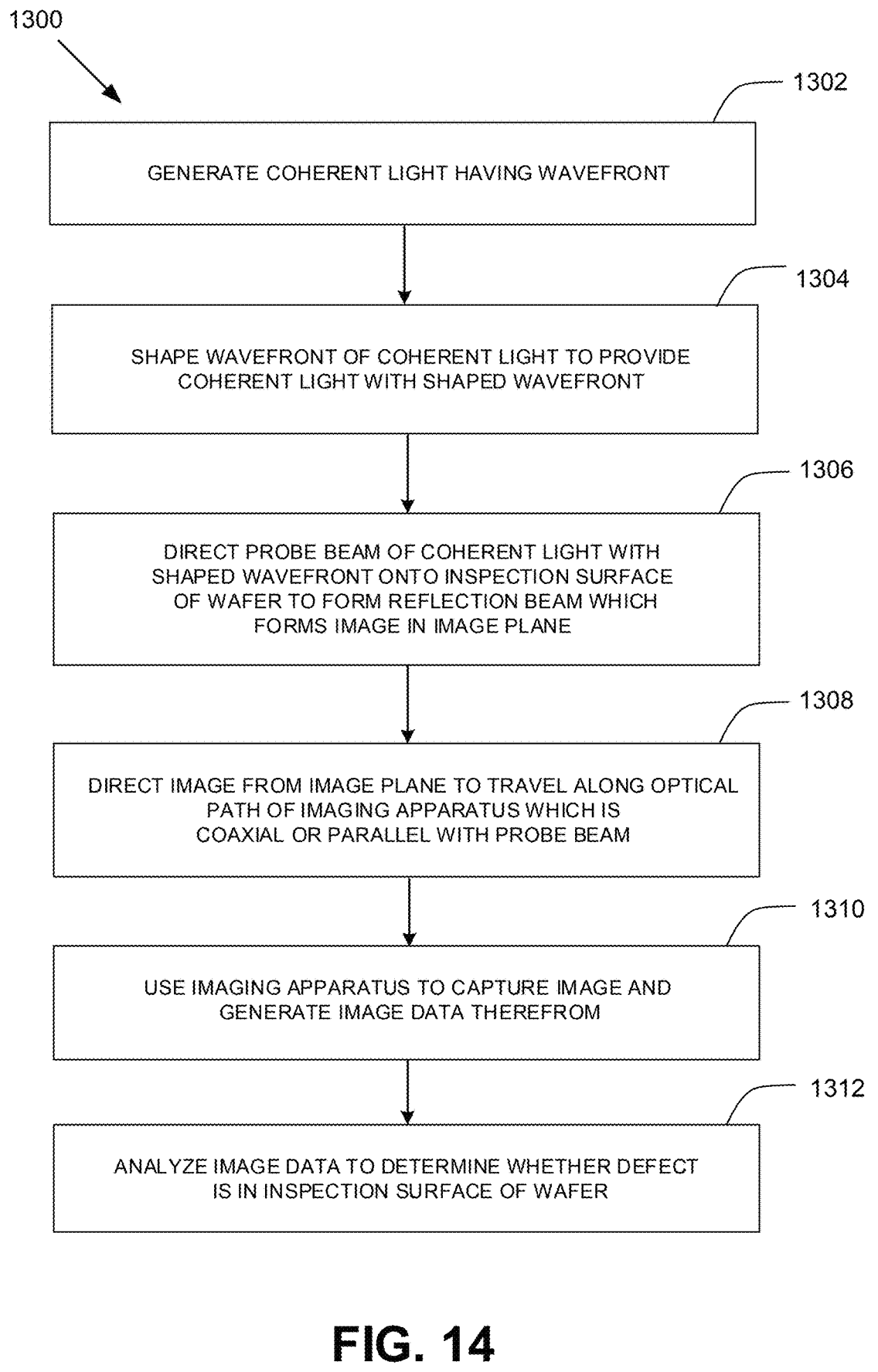

```
GENERATE COHERENT LIGHT HAVING WAVEFRONT
```

1304

```
SHAPE WAVEFRONT OF COHERENT LIGHT TO PROVIDE
COHERENT LIGHT WITH SHAPED WAVEFRONT
```

1306

```
DIRECT PROBE BEAM OF COHERENT LIGHT WITH
SHAPED WAVEFRONT ONTO INSPECTION SURFACE
OF WAFER TO FORM REFLECTION BEAM WHICH
FORMS IMAGE IN IMAGE PLANE
```

1308

```
DIRECT IMAGE FROM IMAGE PLANE TO TRAVEL ALONG OPTICAL
PATH OF IMAGING APPARATUS WHICH IS
COAXIAL OR PARALLEL WITH PROBE BEAM
```

1310

```
USE IMAGING APPARATUS TO CAPTURE IMAGE AND
GENERATE IMAGE DATA THEREFROM
```

1312

```
ANALYZE IMAGE DATA TO DETERMINE WHETHER DEFECT
IS IN INSPECTION SURFACE OF WAFER
```

FIG. 14

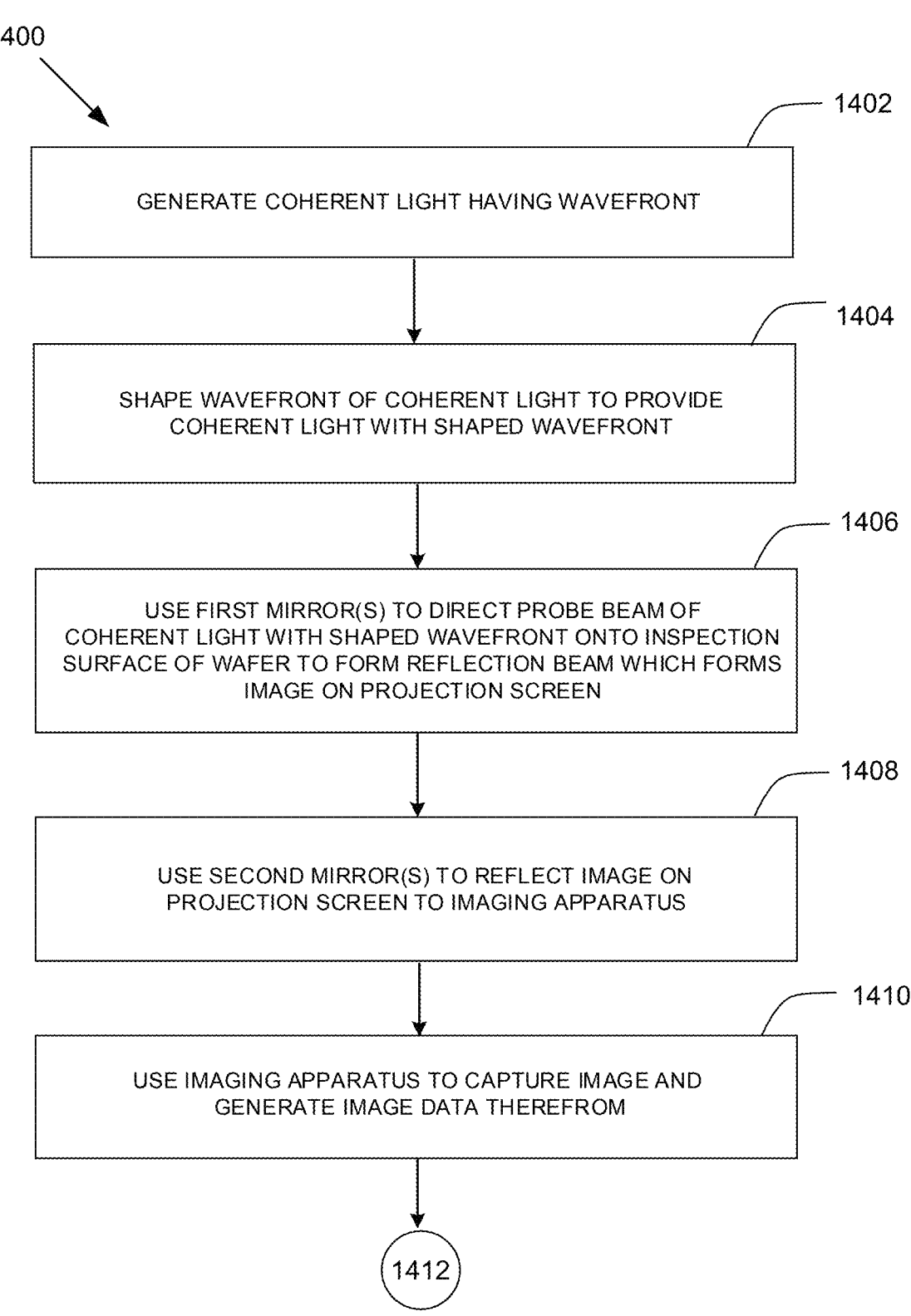

1400

1402

GENERATE COHERENT LIGHT HAVING WAVEFRONT

1404

SHAPE WAVEFRONT OF COHERENT LIGHT TO PROVIDE COHERENT LIGHT WITH SHAPED WAVEFRONT

1406

USE FIRST MIRROR(S) TO DIRECT PROBE BEAM OF COHERENT LIGHT WITH SHAPED WAVEFRONT ONTO INSPECTION SURFACE OF WAFER TO FORM REFLECTION BEAM WHICH FORMS IMAGE ON PROJECTION SCREEN

1408

USE SECOND MIRROR(S) TO REFLECT IMAGE ON PROJECTION SCREEN TO IMAGING APPARATUS

1410

USE IMAGING APPARATUS TO CAPTURE IMAGE AND GENERATE IMAGE DATA THEREFROM

ANALYZE IMAGE DATA TO DETERMINE WHETHER DEFECT
IS IN INSPECTION SURFACE OF WAFER

1412

MOVE FIRST MIRROR(S) TO CHANGE LOCATION ON WAFER
WHERE PROBE BEAM HITS WAFER

1414

MOVE SECOND MIRROR(S) TO KEEP IMAGE REFLECTED
FROM PROJECTION SCREEN IN ALIGNMENT WITH
OPTICAL AXIS OF IMAGING APPARATUS

1416

Figure 17A:
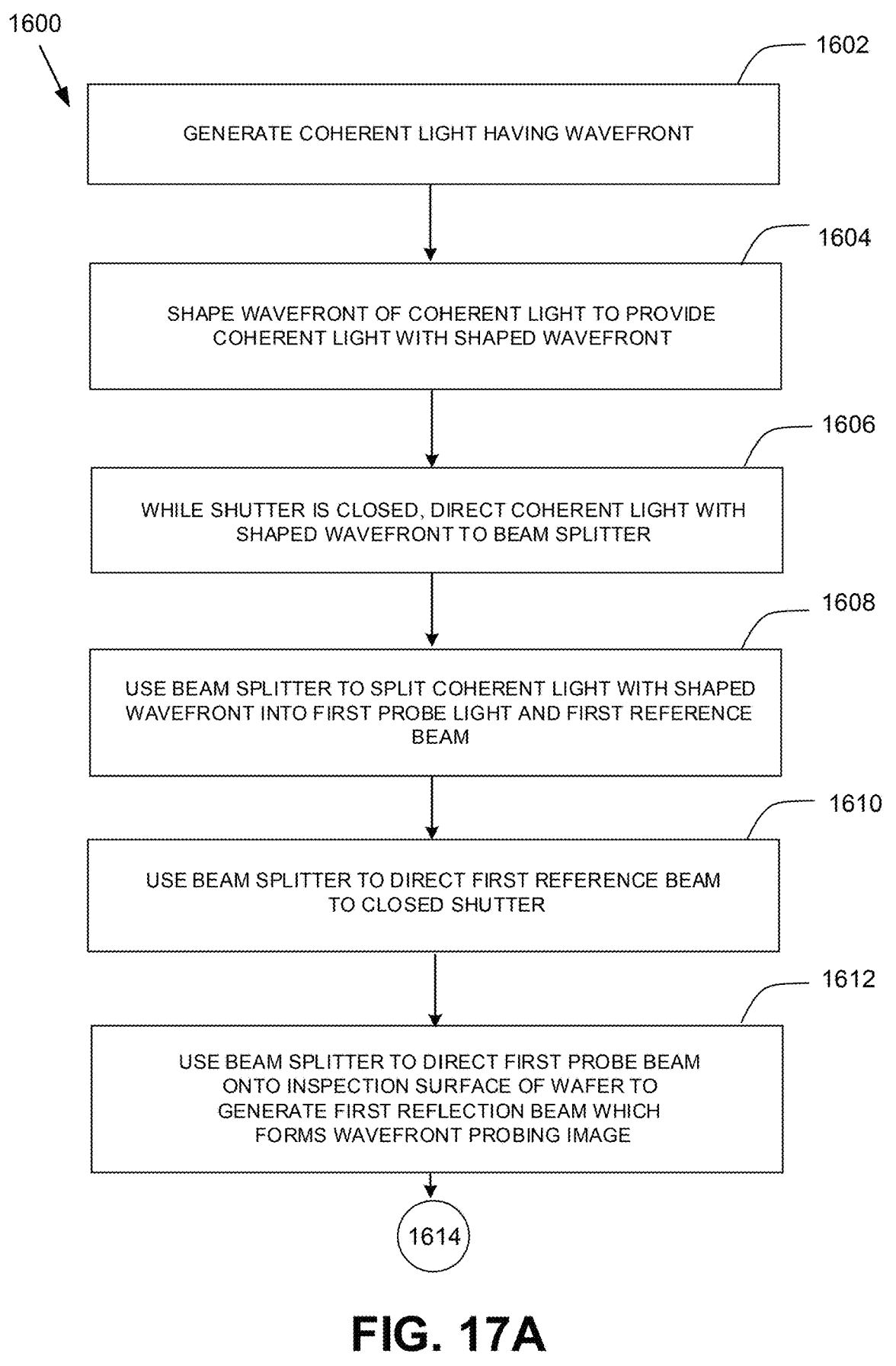

1600

1602

GENERATE COHERENT LIGHT HAVING WAVEFRONT

1604

SHAPE WAVEFRONT OF COHERENT LIGHT TO PROVIDE COHERENT LIGHT WITH SHAPED WAVEFRONT

1606

WHILE SHUTTER IS CLOSED, DIRECT COHERENT LIGHT WITH SHAPED WAVEFRONT TO BEAM SPLITTER

1608

USE BEAM SPLITTER TO SPLIT COHERENT LIGHT WITH SHAPED WAVEFRONT INTO FIRST PROBE LIGHT AND FIRST REFERENCE BEAM

1610

USE BEAM SPLITTER TO DIRECT FIRST REFERENCE BEAM TO CLOSED SHUTTER

1612

USE BEAM SPLITTER TO DIRECT FIRST PROBE BEAM ONTO INSPECTION SURFACE OF WAFER TO GENERATE FIRST REFLECTION BEAM WHICH FORMS WAVEFRONT PROBING IMAGE

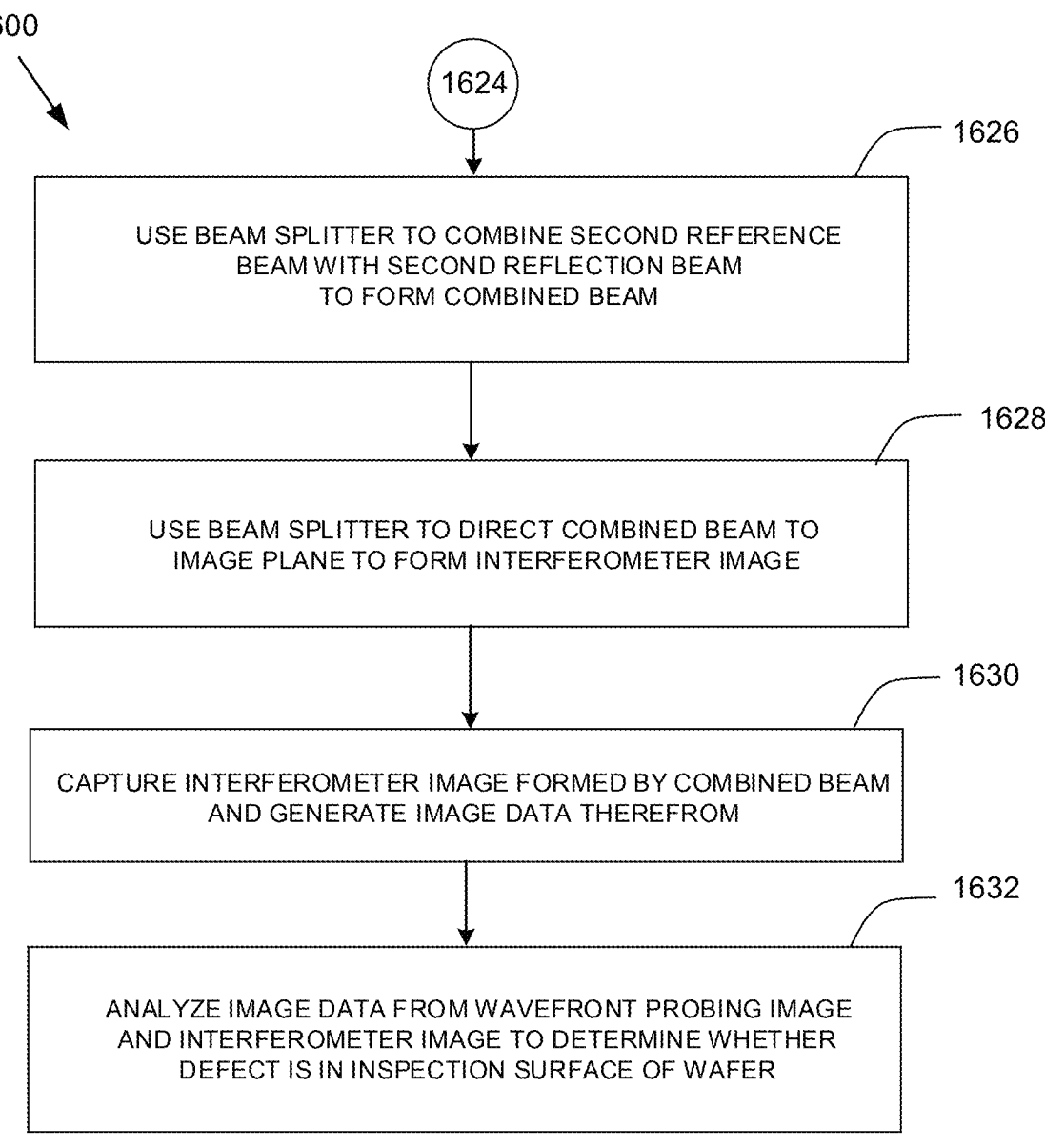

1624

1626

USE BEAM SPLITTER TO COMBINE SECOND REFERENCE
BEAM WITH SECOND REFLECTION BEAM
TO FORM COMBINED BEAM

1628

USE BEAM SPLITTER TO DIRECT COMBINED BEAM TO
IMAGE PLANE TO FORM INTERFEROMETER IMAGE

1630

CAPTURE INTERFEROMETER IMAGE FORMED BY COMBINED BEAM
AND GENERATE IMAGE DATA THEREFROM

1632

ANALYZE IMAGE DATA FROM WAVEFRONT PROBING IMAGE
AND INTERFEROMETER IMAGE TO DETERMINE WHETHER
DEFECT IS IN INSPECTION SURFACE OF WAFER

FIG. 17C

METHOD AND APPARATUS FOR INSPECTING A WAFER

BACKGROUND

Semiconductor devices are formed on, in, and/or from semiconductor wafers, and are used in a multitude of electronic devices, such as mobile phones, laptops, desktops, tablets, watches, gaming systems, and various other industrial, commercial, and consumer electronics. One or more components are used in semiconductor fabrication to form semiconductor devices on, in, and/or from a semiconductor wafer.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 13 shows a flow diagram illustrating a first method of inspecting a wafer having a semiconductor structure bonded thereto, in accordance with some embodiments;

FIG. 14 shows a flow diagram illustrating a second method of inspecting a wafer having a semiconductor structure bonded thereto, in accordance with some embodiments;

FIG. 15A shows a flow diagram illustrating a first portion of a third method of inspecting a wafer having a semiconductor structure bonded thereto, in accordance with some embodiments;

FIG. 17A shows a flow diagram illustrating a first portion of a fifth method of inspecting a wafer having a semiconductor structure bonded thereto, in accordance with some embodiments;

FIG. 17C shows a flow diagram illustrating a third portion of the fifth method of inspecting a wafer having a semiconductor structure bonded thereto, in accordance with some embodiments;

DETAILED DESCRIPTION

Figure 1:
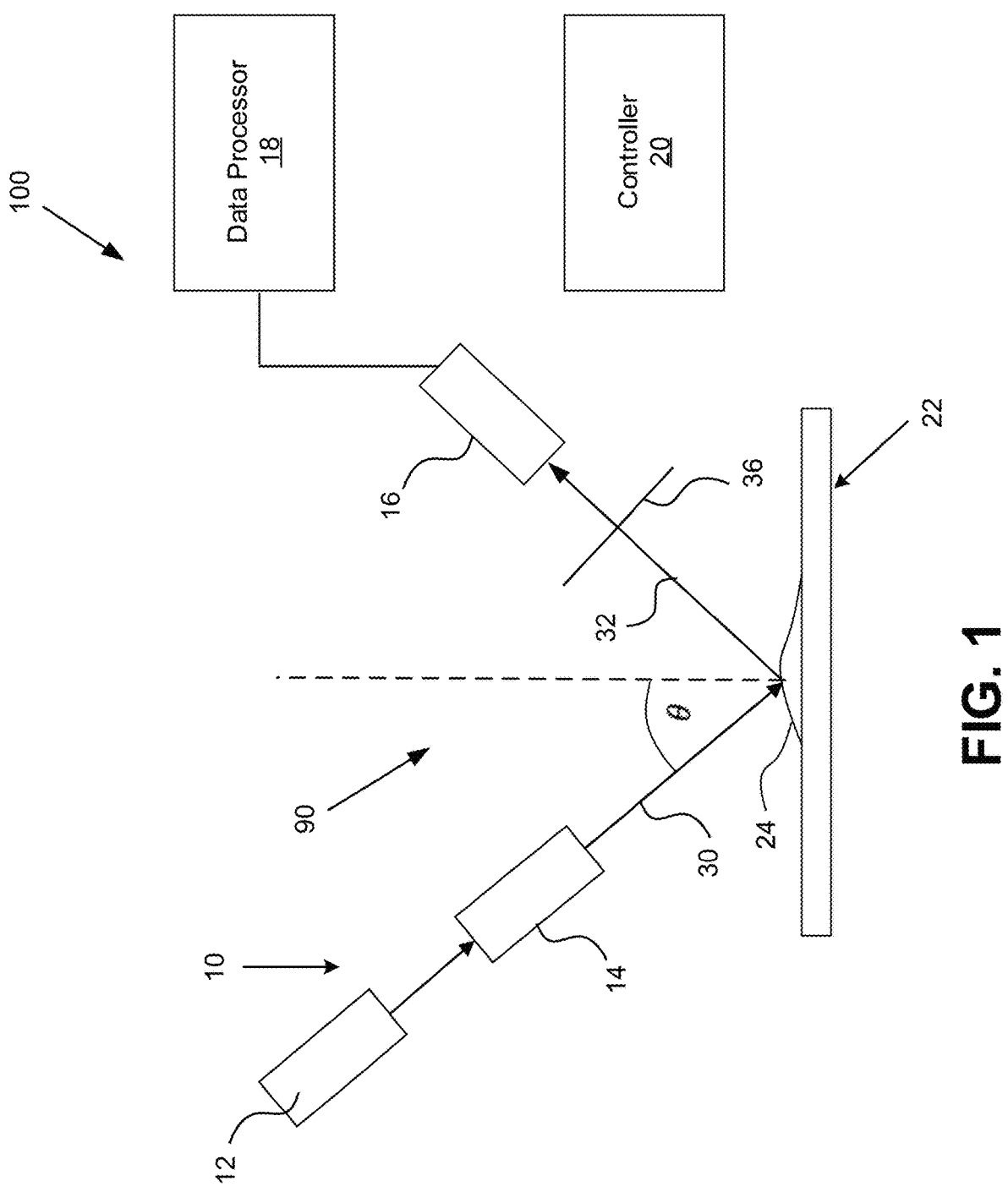
FIG. 1 shows an illustration of an inspection apparatus for inspecting a wafer having a semiconductor structure bonded thereto, in accordance with some embodiments.

The following disclosure provides several different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments or configurations discussed.

Further, spatially relative terms, such as "beneath," "below," "lower," "above," "upper" and the like, may be used herein for ease of description to describe one element or feature's relationship to other element(s) or feature(s) as illustrated in the figures. The spatially relative terms are intended to encompass different orientations of the device in use or operation in addition to the orientation illustrated in the figures. The apparatus may be otherwise oriented (rotated 90 degrees or at other orientations) and the spatially relative descriptors used herein may likewise be interpreted accordingly.

In the manufacture of semiconductor devices, there has been a drive to increase the mounting density of components. Toward that end, techniques have been developed for directly bonding a semiconductor integrated circuit (chip) to a wafer or having wafer-to-wafer bonding. In such bonding techniques, the chip and the wafer or the two wafers should fully contact each other with no voids in-between. On occasion, however, a void may be formed between the chip and the wafer or between the two wafers. Such a void may be caused by a particle becoming trapped between the chip and the wafer or between the two wafers during the bonding process. The void may adversely affect the electrical connection between the chip and the wafer or between the two wafers and typically creates an uneven surface, such as a bulge, on the wafer with the chip or one of both of the bonded wafers. For this reason, such a void between the chip and the wafer or between the two wafers may be considered a defect and may, at times, be referred to as a bulge defect or a void defect.

For ease of description the term "semiconductor structure" may hereinafter be used to refer both to a chip, which is bonded to or will be bonded to a wafer, as well as to a second wafer, which is bonded to or will be bonded to a wafer. A variety of techniques exist for bonding semiconductor structures to wafers and bonding wafers to other wafers. The methods and apparatus described herein are not necessarily limited to any one of these techniques.

A bulge defect may be detected by point probing using a laser with a narrow beam of light, or by using a scanning acoustic microscope (SAM), a confocal scanning acoustic microscope (CSAM) or a C-mode scanning acoustic microscope (C-SAM). These methods and/or apparatus are useful for applications that do not require high throughput and/or are used later in the semiconductor device manufacturing process. According to some embodiments, an inspection method and/or apparatus described herein is used to detect bulge defects in higher throughput applications that are more proximate to the bonding of the semiconductor structure to the wafer.

According to some embodiments, an inspection method includes generating coherent light that has a wavefront (e.g., a locus of points with the same phase). The wavefront of the coherent light is shaped to provide the coherent light with a shaped wavefront. A probe beam of the coherent light with the shaped wavefront is directed onto an inspection surface of a wafer where a semiconductor structure is bonded thereto, thereby causing a reflection beam to be reflected from the inspection surface of the wafer. An image formed by the reflection beam reflected from the inspection surface of the wafer is captured and image data is generated therefrom, which is then analyzed. Based on the analysis of the image data, a determination is made whether there is a bulge defect or other defect in the inspection surface of the wafer.

According to some embodiments, an inspection apparatus includes a probe beam generation device configured to emit a probe beam to an inspection surface of a wafer to thereby generate a reflection beam reflected from the inspection surface. The probe beam generation device includes a coherent light source and a wavefront shaping device. The coherent light source is configured to generate coherent light and the wavefront shaping device is configured to shape a wavefront of the coherent light to provide the coherent light with a shaped wavefront. The probe beam includes the coherent light with the shaped wavefront. An imaging apparatus, which is also be included in the inspection apparatus, is configured to capture an image formed by the reflection beam and to generate image data therefrom. A data processing system is also be part of the inspection apparatus and is configured to analyze the image data from the imaging apparatus to determine if there is a bulge defect or other defect in the inspection surface of the wafer.

FIG. 1 illustrates an inspection apparatus 100 in accordance with some embodiments. The inspection apparatus 100 is used to perform bulge defect detection methods, such as that described above and elsewhere herein. The inspection apparatus 100 is used for inspecting a wafer 22, such as a semiconductive substrate, a processed silicon wafer, a silicon-on-insulator (SOI) substrate, a P-type substrate or an N-type substrate. The wafer 22 has one or more semiconductor structures 24 bonded thereto. In some embodiments, the wafer 22 includes one or more transistors, one or more circuit structures, one or more interconnect structures or a combination thereof.

The inspection apparatus 100 generally includes an inspection device 90 that includes a probe beam generation device 10 and an imaging apparatus 16. The inspection apparatus 100 includes a data processing system 18 and a controller 20. The probe beam generation device 10 is configured to generate a probe beam 30, which is to be directed onto an inspection surface of the wafer 22. The probe beam generation device 10 includes coherent light source 12 and a wavefront shaping device 14. Other structures, devices, and configurations of the inspection apparatus 100 are within the scope of the present disclosure.

The coherent light source 12 emits coherent light (e.g., light of the same frequency, same wavelength, and same phase or constant phase difference, such as fixed phase relationship). The coherent light source 12 is a laser or a specialized lamp with suitable optical filtering. The coherent light from the coherent light source 12 is conditioned by the wavefront shaping device 14 to shape its wavefront, thereby providing the coherent light with a shaped wavefront. The probe beam 30 comprises the coherent light with the shaped wavefront.

The wavefront shaping device 14 includes one or more lenses and/or one or more mirrors for shaping the wavefront. Alternately, the wavefront shaping device 14 includes holographic optical elements, diffractive optical elements, digital mirror devices (DMDs), spatial light modulators (SLMs), and/or metasurfaces.

Generally, the wavefront shaping device 14 expands the coherent light from the coherent light source 12. The wavefront shaping device 14 shapes the wavefront of the coherent light to be flat or planar, spherical, aspherical or another type of shape. The specific shape of the wavefront is determined based on the topography of the inspection surface of the wafer 22 with the semiconductor structure 24. For example, the inspection surface is flat or irregular due to the presence of a structural protrusion on the wafer 22, such as a device mounted on the one or more semiconductor structures 24. In either situation, the wavefront has a shape that has been predetermined to produce a planar wavefront in the light reflected from the wafer 22 (e.g., a reflection beam 32). If the inspection surface is flat, the shaped waveform is planar, in some embodiments. However, if the inspection surface is not flat and is instead irregular, a non-planar waveform is used, in some embodiments. According to some embodiments, the non-planar waveform has a specific shape that has been predetermined to produce a planar wavefront in the light reflected from the wafer 22 with the structural protrusion, thereby compensating for the presence of the structural protrusion.

The probe beam 30 with the shaped wavefront makes contact with an inspection surface of the wafer 22 with the one or more semiconductor structures 24 bonded thereto. The probe beam 30 with the shaped wavefront hits or is incident upon the inspection surface at an incident angle θ, which is typically an acute angle of from about 20° to about 60° from normal. The probe beam 30 is reflected from the inspection surface as the reflection beam 32 with a wavefront that is distorted by a bulge defect. For example, the reflection beam 32 is distorted by a shape variation in the inspection surface caused by a bulge defect. The reflection beam 32 travels along a reflection path at a reflection angle.

As described above, the shape of the wavefront of the probe beam 30 is selected to provide the reflection beam 32 with a planar wavefront. A bulge defect on the wafer 22 (e.g., regardless whether the inspection surface is flat or irregular) will produce a distortion in the planar wavefront in the reflection beam 32. A focused image of the inspection surface with a distortion pattern appears in an image plane 36. The imaging apparatus 16 is used to capture the image of the inspection surface with the distortion pattern in the image plane 36 and to generate image data therefrom. The imaging apparatus 16 has a focus plane that coincides with the image plane 36.

The image plane 36 is located a distance from the inspection surface of the wafer 22, along the reflection path. The distance is determined by the wavelength of the coherent light generated by the coherent light source 12. If the coherent light source 12 with a first wavelength is replaced with another coherent light source having a different, second wavelength, the location of the image plane 36 will change. This change in location is accommodated by changing the focus plane of the imaging apparatus 16. Coherent light sources of various wavelengths are used to generate the coherent light, according to some embodiments.

The imaging apparatus 16 is operable to capture digital video images as well as digital still images. In some embodiments, the imaging apparatus 16 includes a camera having a digital image sensor and an objective lens optically coupled to the digital image sensor. The digital image sensor has a pixel count of at least 10 megapixels (MP), thereby allowing the camera to capture high resolution digital images in the image plane 36.

The data processing system 18 is communicatively coupled to the imaging apparatus 16 to receive (e.g., digital) image data from the imaging apparatus 16. The data processing system 18 includes memory for storing the received image data and one or more processors for processing the image data. In some embodiments, the one or more processors are configured to execute a machine vision software program to analyze the image data to identify distortions in the wavefront of the reflection beam 32, thereby detecting bulge defects and/or other defects in the inspection surface of the wafer 22. The machine vision software program is stored in the memory of the data processing system 18.

In some embodiments, the data processing system 18 is configured to execute a defect classification software program to analyze the image data to classify detected defects. Such classification indicates a source of the defect, such as a particular aspect of the manufacturing process of the wafer 22. The defect classification software program includes a machine learning model that is trained using a library of images of previously classified defects. The defect classification software program is stored in the memory of the data processing system 18.

In some embodiments, the data processing system 18 includes a user interface device (e.g. user interface 1810) configured to display the digital images of the wafer 22 collected by the imaging apparatus 16. A user viewing the images on the user interface device is generally able to visually detect bulge defects and/or other types of defects in the inspection surface of the wafer 22.

The controller 20 is operatively connected to, and controls the operation and interaction of, one or more of the components of the inspection device 90, such as the coherent light source 12 and the imaging apparatus 16. The controller 20 also interacts with the data processing system 18. The controller 20 is connected to components of the inspection device 90 by wireless connections and/or hardwire connections. Hardwire connections are not shown for purposes of simplicity and clarity.

Figure 2:
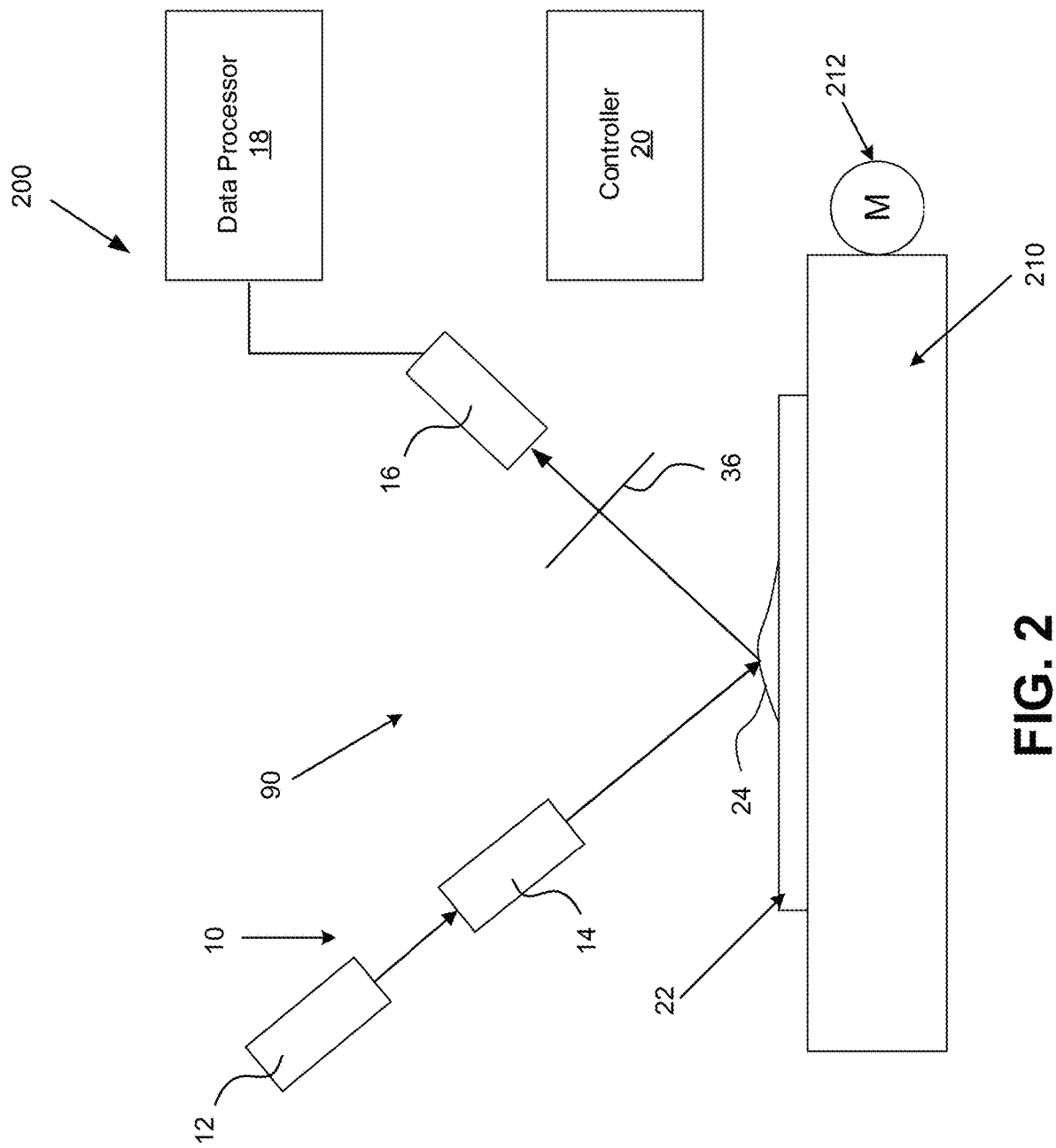
FIG. 2 shows an illustration of a semiconductor apparatus for inspecting a wafer having a semiconductor structure bonded thereto, wherein the wafer is mounted to a movable stage, in accordance with some embodiments.

In some embodiments, the inspection device 90 is fixed in position and the wafer 22 with the one or more semiconductor structures 24 bonded thereto is movable relative thereto. For example, in an inspection apparatus 200 shown in FIG. 2, the wafer 22 with the semiconductor structure 24 is held securely on a multi-axis movable stage 210, located below the inspection device 90. The stage 210 is configured to be linearly moved, lowered, raised, rotated, tilted or otherwise adjusted to reposition the orientation of the wafer 22. This movement is effected by one or more stepper motors 212. Other structures, devices, and configurations of the inspection apparatus 200 are within the scope of the present disclosure.

With regard to linear movement, the stage 210 is configured to linearly move the wafer 22 along one axis (e.g., along an X-axis) or along two axes (e.g., along both X- and Y-axes). For example, the stage 210 linearly moves the wafer 22 in a direction extending between the coherent light source 12 and the imaging apparatus 16, and/or in a direction perpendicular thereto. The stage 210 is also configured to tilt the wafer 22 in order to level the wafer 220. The stage 210 is configured to raise or lower the wafer 220 (e.g., along a Z-axis), for example, in order to increase or decrease the distance between the inspection device 90 and the wafer 22.

The stage 210 with the wafer 22 mounted thereto is linearly moved step-by-step to capture images of all portions of the entire wafer 22. This step-by-step movement is coordinated with the inspection device 90 such that after each step of movement, the movement of the stage 210 is paused, the probe beam 30 is directed onto the wafer 22 and the imaging apparatus 16 captures an image of the reflection beam 32 in the image plane 36. After the image is captured, the stage 210 moves another step and the procedure is repeated. This step-wise scanning process is performed along a plurality of paths. For example, the step-wise scanning process proceeds on a first path along the X-axis at a first fixed Y-coordinate for the entire length of the wafer 22 and then is translated such that the probe beam 30 is repositioned at a second Y-coordinate. The stage 210 with the wafer 22 is then moved step-by-step on a second path in the opposite direction along the X-axis for the entire length of the wafer 22. This procedure is repeated until the entire wafer 22 is scanned and images are captured of all portions of the entire wafer 22.

In some embodiments, the stage 210 with the wafer 22 mounted thereto is moved to capture images of certain portions of the wafer 22, such as inspection surfaces where chips or other semiconductor structures are bonded to the wafer 22.

The movement of the stage 210 is controlled by the controller 20. The controller 20 is connected to and communicate with the one or more stepper motors 212 and components of the inspection device 90 to control them in a coordinated manner to perform the scanning process of the wafer 22 described above.

Figure 3:
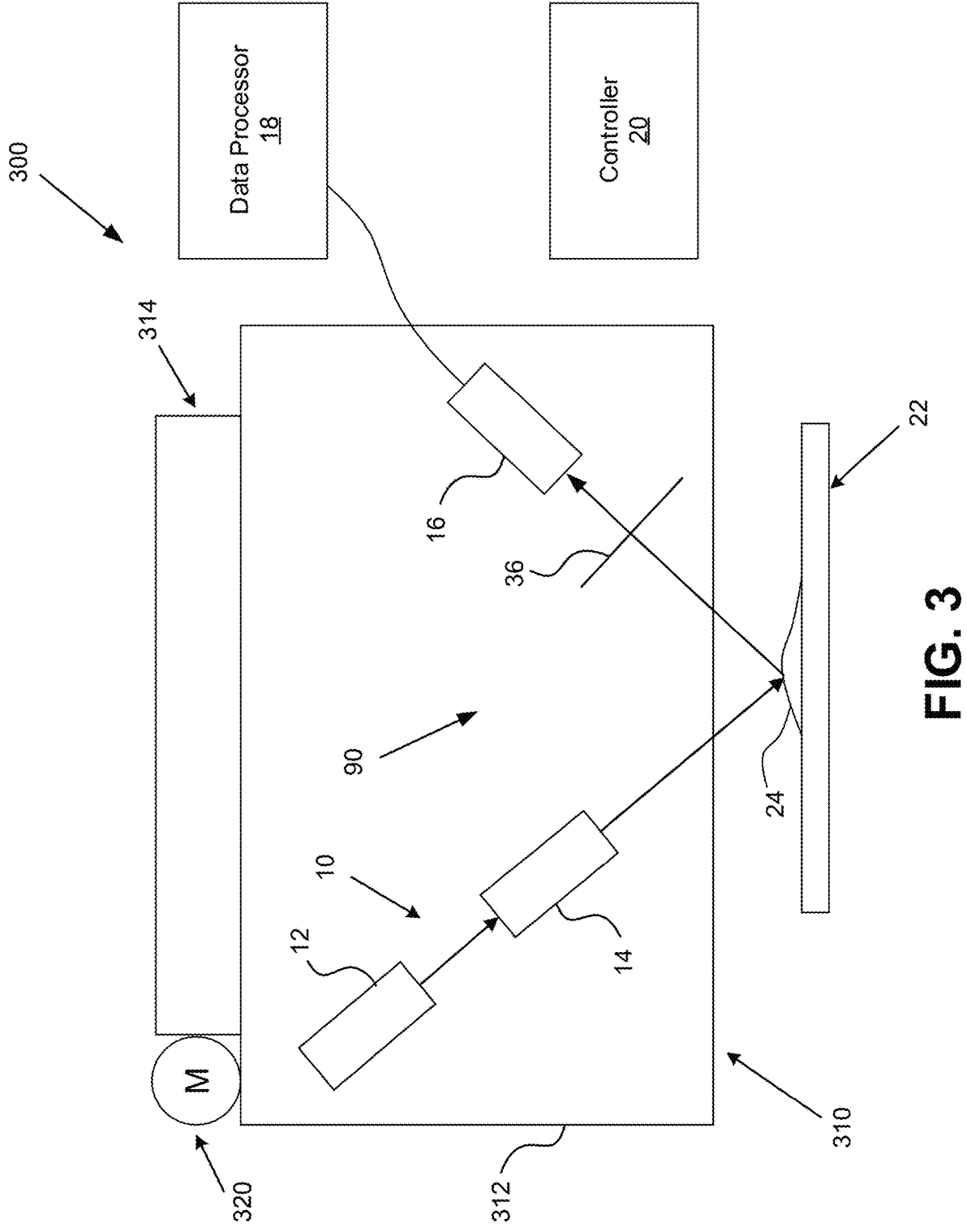
FIG. 3 shows an illustration of a semiconductor apparatus having an inspection module for inspecting a wafer having a semiconductor structure bonded thereto, wherein the inspection module is mounted to a movable stage, in accordance with some embodiments.

In some embodiments, the wafer 22 is fixed in position and the inspection device 90 or components thereof are movable relative thereto. For example, in an inspection apparatus 300 shown in FIG. 3, the inspection device 90 is part of a movable inspection module 310. The inspection module 310 includes a housing 312 that holds the inspection device 90. The housing 312 has an open bottom through which the probe beam 30 and the reflection beam 32 freely passes. The inspection module 310 is secured to a bottom portion of a movable multi-axis stage 314. The wafer 22 with the one or more semiconductor structures 24 is fixedly mounted below the inspection module 310 and is contacted by the probe beam 30 of the inspection device 90, with the reflection beam 32 traveling back to the image plane 36 inside the housing 312 of the inspection module 310. Other structures, devices, and configurations of the inspection apparatus 300 are within the scope of the present disclosure.

Similar to the stage 210, the stage 314 is configured to be linearly moved, lowered, raised, rotated, tilted or otherwise adjusted to reposition the orientation of the inspection module 310 and, thus, the inspection device 90. This movement is effected by one or more stepper motors 320. With regard to linear movement, the stage 314 is configured to linearly move the inspection device 90 along one axis (e.g., along an X-axis) or along two axes (e.g., along both X- and Y-axes). For example, the stage 314 linearly moves the inspection device 90 in a longitudinal direction of the wafer 22, and/or in a direction perpendicular thereto. The stage 314 is also be configured to tilt the inspection device 90 to compensate for an unlevel position of the wafer 22. The stage 314 is configured to raise or lower the inspection device 90 (e.g., along a Z-axis), for example, in order to increase or decrease the distance between the inspection device 90 and the wafer 22.

In some embodiments, the stage 314 with the inspection module 310 mounted thereto is linearly moved step-by-step to capture images of all portions of the entire wafer 22. This step-by-step movement is coordinated with the inspection device 90 such that after each step of movement, the movement of the stage 314 is paused, the probe beam 30 is directed onto the wafer 22 and the imaging apparatus 16 captures an image of the reflection beam 32 in the image plane 36. After the image is captured, the stage 314 moves another step and the procedure is repeated. This step-wise scanning process is performed along a plurality of paths. For example, the step-wise scanning process proceeds on a first path along the X-axis at a first fixed Y-coordinate for the entire length of the wafer 22 and then is translated such that the probe beam 30 is repositioned at a second Y-coordinate. The stage 314 with the inspection module 310 then moves step-by-step on a second path in the opposite direction along the X-axis for the entire length of the wafer 22. This procedure is repeated until the entire wafer 22 is scanned and images are captured of all portions of the entire wafer 22.

In some embodiments, the stage 314 with the inspection module 310 mounted thereto is moved to capture images of certain portions of the wafer 22, such as inspection surfaces where chips or other semiconductor structures are bonded to the wafer 22.

The movement of the stage 314 and the operation of the inspection device 90 is controlled by the controller 20. The controller 20 is connected to and communicate with the stepper motors 320 and components of the inspection device 90 (e.g., the coherent light source 12 and the imaging apparatus 16) to control them in a coordinated manner to perform the scanning process of the wafer 22 described above.

Figure 4:
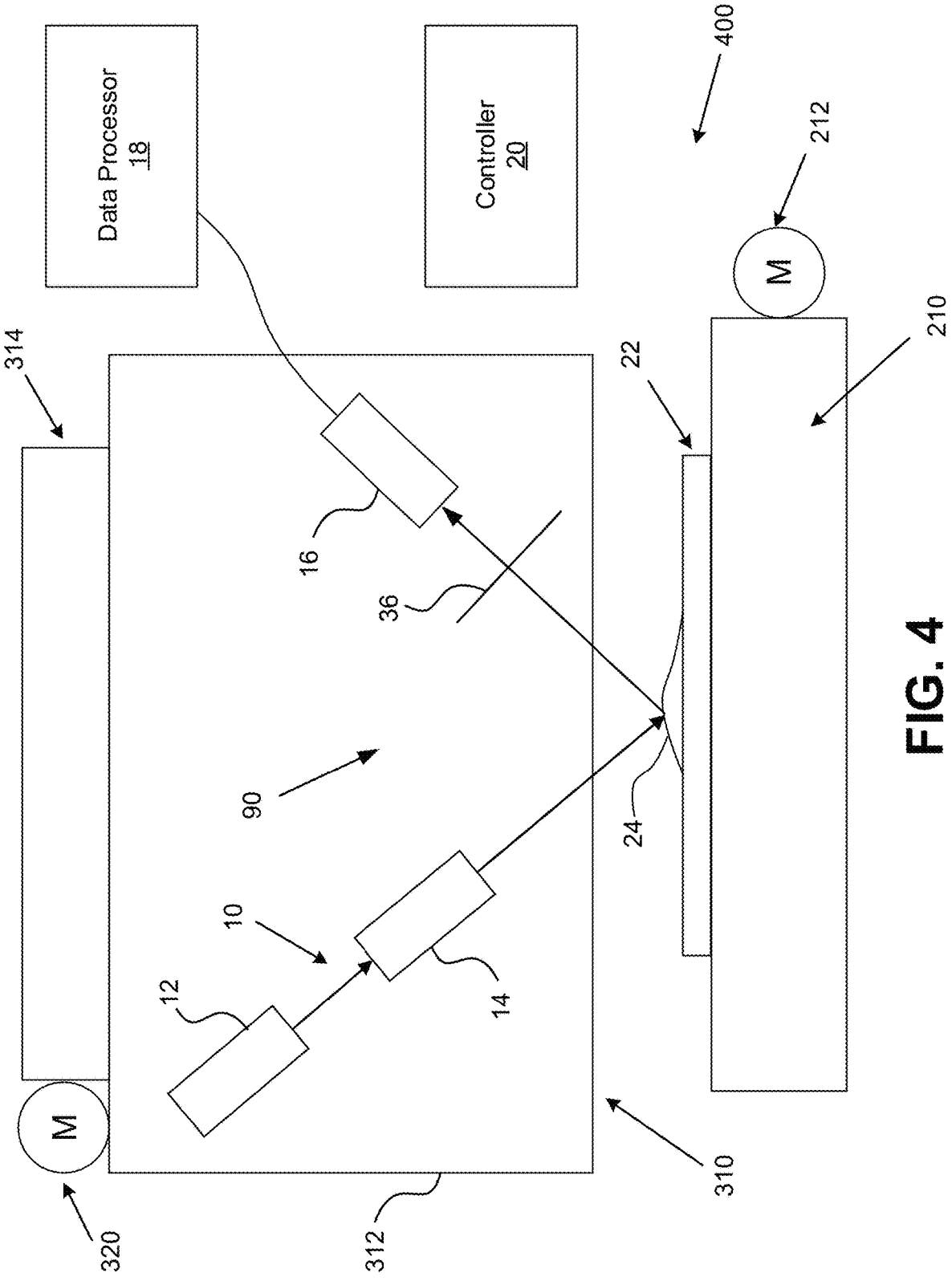
FIG. 4 shows an illustration of a semiconductor apparatus having an inspection module for inspecting a wafer having a semiconductor structure bonded thereto, wherein the wafer and the inspection module are mounted to movable stages, respectively, in accordance with some embodiments.

Instead of being fixedly mounted below the inspection module 310, the wafer 22 with the semiconductor structure 24 is mounted on a multi-axis movable stage, such as the stage 210 so as to be movable, as shown in FIG. 4. In the inspection apparatus 400 shown in FIG. 4, both the wafer 22 and the inspection device 90 are movable to perform the scanning processes of the wafer 22 described above.

Figure 5:
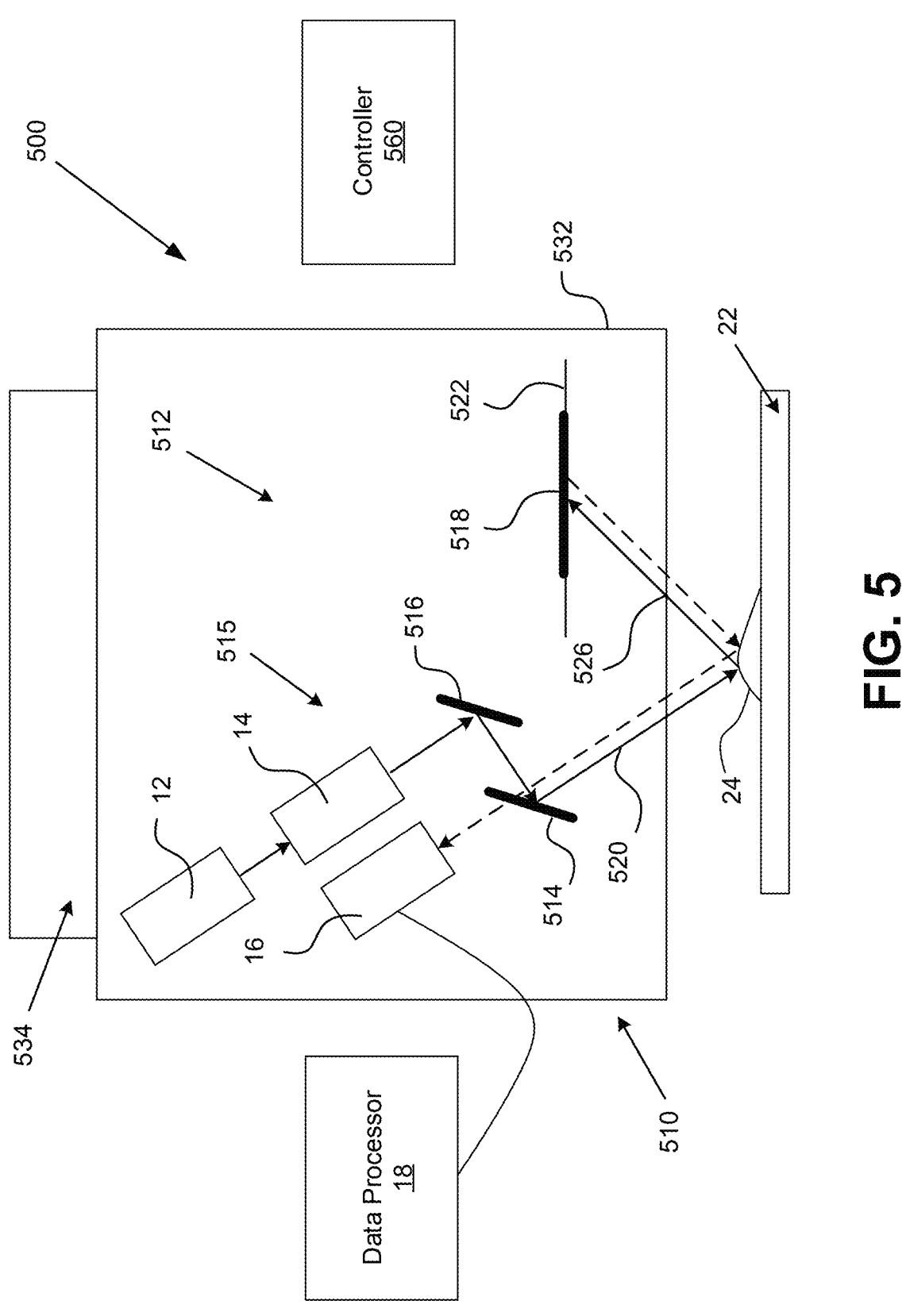
FIG. 5 shows an illustration of a semiconductor apparatus having an inspection module for inspecting a wafer having a semiconductor structure bonded thereto, wherein the inspection module is mounted to a movable stage and generates a probe beam that is coaxial with an optical axis of imaging apparatus, in accordance with some embodiments.

Referring to FIG. 5, there is shown an inspection apparatus 500 in accordance with some embodiments. The inspection apparatus 500 includes an inspection module 510 that holds an inspection device 512 above the wafer 22 with one or more semiconductor structures 24. The inspection device 512 includes a probe beam generation device 515, the imaging apparatus 16 and a light panel 518, which is a retroreflector or a projection screen. The probe beam generation device 515 generates a probe beam 520 and includes the coherent light source 12, the wavefront shaping device 14, a beam splitter 514, and a mirror 516. The inspection apparatus 500 includes the data processing system 18 and a controller 560, in some embodiments. Other structures, devices, and configurations of the inspection apparatus 500 are within the scope of the present disclosure.

The imaging apparatus 16 is disposed adjacent to and in close proximity to the coherent light source 12 and the wavefront shaping device 14, in some embodiments. The beam splitter 514 and the mirror 516 are arranged below the imaging apparatus 16, the coherent light source 12, and the wavefront shaping device 14. Coherent light is generated by the coherent light source 12 and is conditioned by the wavefront shaping device 14 to have a shaped wavefront. The coherent light with the shaped wavefront is reflected by the mirror 516 to the beam splitter 514, which directs it toward the inspection surface of the wafer 22 as the probe beam 520. The probe beam 520 hits the inspection surface, thereby causing a reflection beam 526 to be reflected from the inspection surface with a wavefront that is distorted by a bulge defect. The reflection beam 526 travels to an image plane 522 in which an image is formed. The light panel 518 is located in the image plane 522 and reflects the image back through the beam splitter 514 to the imaging apparatus 16 via the inspection surface. The imaging apparatus 16 captures the image from the light panel 518 and generates image data therefrom. As described above, the light panel 518 is a projection screen or a retroreflector.

In the arrangement of the inspection apparatus 500 described above, the probe beam 520 hits the inspection surface of the wafer 22 at an incident angle, which is typically an acute angle of from about 20° to about 60° from normal. The optical axis of the imaging apparatus 16 is parallel to the path of the probe beam 520 incident upon the inspection surface of the wafer 22.

Similar to that described above for the inspection apparatus 100, the data processing system 18 in the inspection apparatus 500 receives the image data from the imaging apparatus 16 and analyzes the image data to identify distortions in the wavefront of the reflection beam 526, thereby detecting bulge defects and/or other defects in the inspection surface of the wafer 22. The data processing system 18 also displays detected defects on a user interface and classify detected defects, also as described above.

The inspection module 510 includes a housing 532 enclosing at least a portion of the inspection device 512 and having an open bottom through which the probe beam 520 and the reflection beam 526 freely passes. The inspection module 510 is secured to a bottom portion of a movable multi-axis stage 534, as shown. The wafer 22 with the semiconductor structure 24 is fixedly mounted below the inspection device 512 and is contacted by the probe beam 520 of the inspection device 512, with the reflection beam 526 traveling back to the image plane 522 inside the housing 532 of the inspection module 510.

The stage 534 is configured to be linearly moved, raised, lowered, rotated, tilted, or otherwise adjusted to reposition the orientation of the inspection module 510 and, thus, the inspection device 512. In addition, the stage 534 with the inspection module 510 is moved step-by-step to scan all or portions of the wafer 22 and thereby capture images of all or portions of the entire wafer 22.

In the inspection device 512, the probe beam 520 and an optical axis of the imaging apparatus 16 is coaxial or closely parallel. This arrangement helps facilitate a compact arrangement of the components of the inspection device 512, such as the coherent light source 12, the wavefront shaping device 14 and the imaging apparatus 16. The compact structure of the inspection device 512 permits the inspection device 512 and the inspection module 510 to be used in applications having space constraints. An example of such an application is mounting the inspection module 510 to fabrication equipment.

Figure 6:
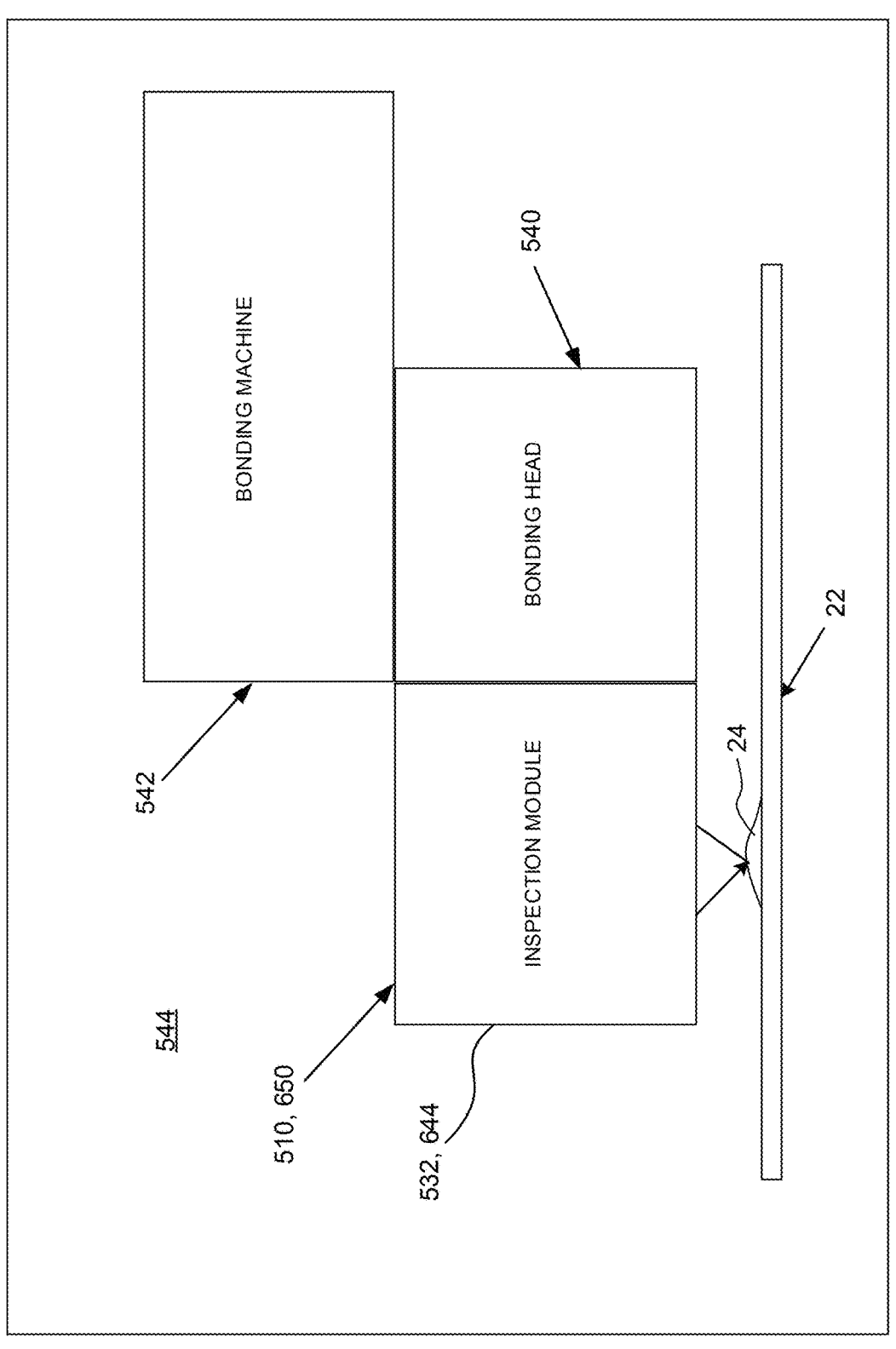
FIG. 6 shows an illustration of a semiconductor apparatus having an inspection module mounted to a bonding head of a bonding machine, in accordance with some embodiments.

In some embodiments, the inspection module 510 is mounted to a bonding head 540 of a bonding machine 542 for bonding one or more semiconductor structures 24 to the wafer 22, as shown in FIG. 6. In such embodiments, the inspection module 510 is located inside a processing chamber 544 where the bonding occurs and moves with the bonding head 540. A semiconductor structure 24, such as a chip, is bonded to the wafer 22 and the inspection device 512 thereafter captures an image of an inspection surface, where the semiconductor structure 24 is bonded to the wafer 22. The bonding head 540 with the inspection module 510 then moves to another location on the wafer 22 where a second semiconductor structure 24 is bonded to the wafer 22 and, thereafter, the inspection device 512 captures an image of an inspection surface, where the second semiconductor structure 24 was bonded to the wafer 22. This procedure is repeated until all of the semiconductor structures 24 required to be mounted to the wafer 22 are bonded in place, with images being captured for all the bonding locations of the semiconductor structures 24.

The operation of the inspection device 512 is controlled by the controller 560. In embodiments where the inspection module 510 is mounted to the bonding head 540, the controller 560 controls the inspection device 512 in coordination with the control of the bonding machine 542 to perform the process of obtaining images of the wafer 22 described above. The imaging apparatus 16 generates image data from the captured images, which is then analyzed by the data processing system 18.

Figure 7:
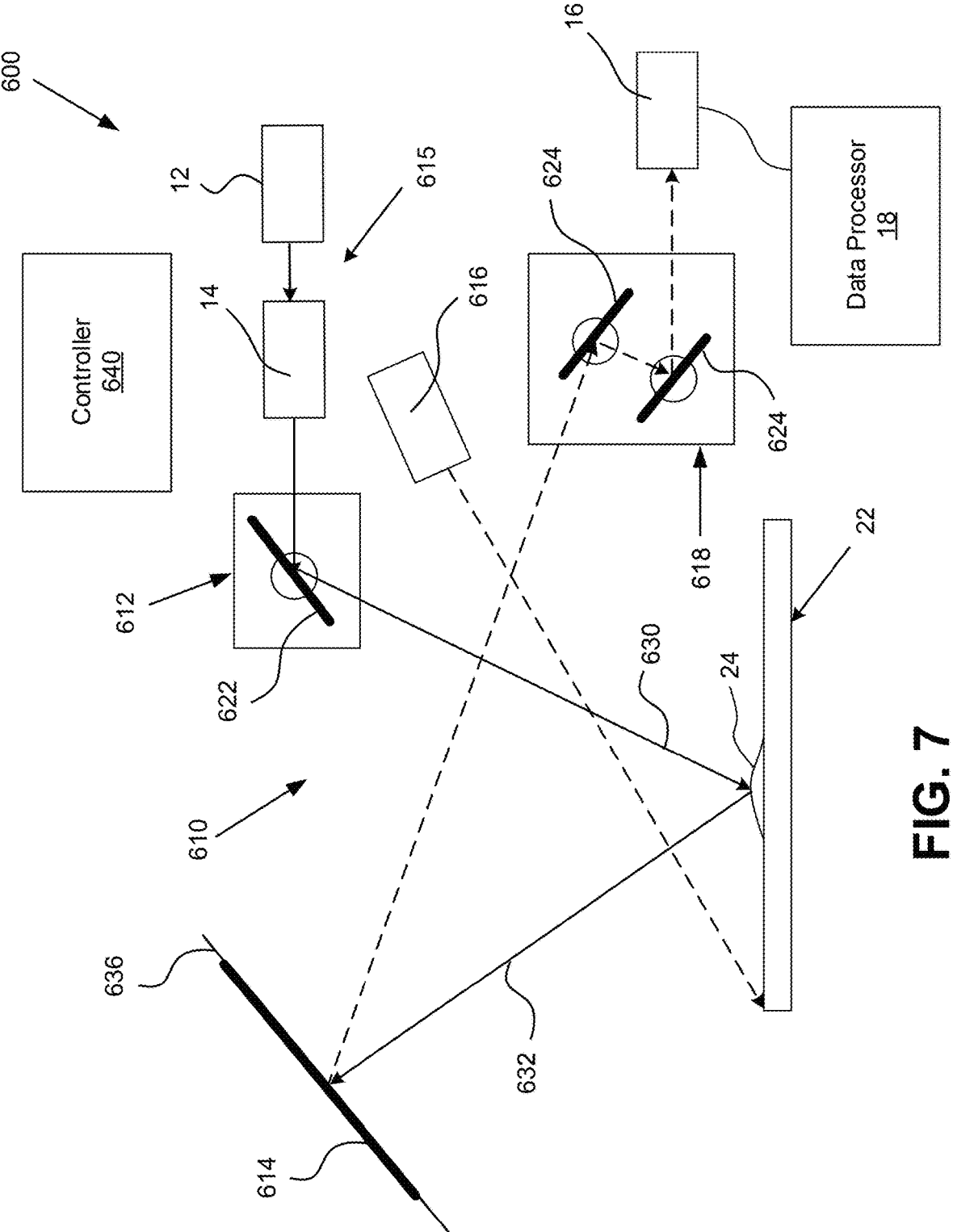
FIG. 7 shows an illustration of a semiconductor apparatus having an inspection device for inspecting a wafer having a semiconductor structure bonded thereto, wherein the inspection device includes first and second galvanometric scanners, in accordance with some embodiments.

Referring now to FIG. 7, there is shown an inspection apparatus 600 in accordance with some embodiments. The inspection apparatus 600 includes an inspection device 610, which includes a probe beam generation device 615, the imaging apparatus 16, a projection screen 614, a global camera 616, and a second galvanometric scanner 618. The probe beam generation device 615 generates a probe beam 630 and includes the coherent light source 12, the wavefront shaping device 14, and a first galvanometric scanner 612. The wafer 22 with the semiconductor structure 24 is fixedly mounted below the inspection device 610. The inspection apparatus 600 includes the data processing system 18 and a controller 640. Other structures, devices, and configurations of the inspection apparatus 600 are within the scope of the present disclosure.

The first galvanometric scanner 612 includes one or more first mirrors 622 that are precisely rotated by a galvanometer having one or more limited rotation DC motors with closed loop servo control. In some embodiments, the second galvanometric scanner 618 includes one or more second mirrors 624 that are precisely rotated by a galvanometer having one or more limited rotation DC motors with closed loop servo control.

Coherent light is generated by the coherent light source 12 and is conditioned by the wavefront shaping device 14 to have a shaped wavefront. The coherent light with the shaped wavefront travels to the first galvanometric scanner 612, which redirects it downwardly as the probe beam 630, onto an inspection surface of the wafer 22. The probe beam 630 is reflected from the inspection surface as reflection beam 632 with a wavefront that is distorted by a bulge defect. The reflection beam 632 travels to an image plane 636 in which an image is formed. The projection screen 614 is located in the image plane 636 and displays the image, which includes distortions indicative of bulge defects. The image is transmitted to the imaging apparatus 16 via the second galvanometric scanner 618. The imaging apparatus 16 captures the image and generates image data therefrom.

The first galvanometric scanner 612 moves the one or more first mirrors 622 to change the location of the probe beam 630 on the wafer 22. For example, the one or more first mirrors 622 are incrementally moved to move the probe beam 630 in step-wise fashion to scan all of the wafer 22 or portions of the wafer 22, such as inspection surfaces where chips are bonded to the wafer 22. The movement of the probe beam 30 across the wafer 22 causes the images formed on the projection screen 614 to move across the projection screen 614, which, in turn, causes the images from the projection screen 614 to move relative to the imaging apparatus 16. In order for the imaging apparatus 16 to properly capture the moving images, the one or more second mirrors 624 of the second galvanometric scanner 618 are moved to keep the images aligned with the optical axis of the imaging apparatus 16. The first galvanometric scanner 612 and the second galvanometric scanner 618 are controlled to synchronize the movement of the one or more first mirrors 622 with the movement of the one or more second mirrors 624.

The controller 640 is operatively connected to the inspection device 610 to control its components. For example, the controller 640 controls the first galvanometric scanner 612 to move the one or more first mirrors 622 (and, thus, the probe beam 630) from one chip-bonding location to another on the wafer 22. In connection therewith, the controller 640 uses image data from the global camera 616 to locate the chip-bonding locations. The controller 640 also controls the second galvanometric scanner 618 to control the movement of the one or more second mirrors 624 in coordination with the movement of the one or more first mirrors 622 (and, thus, the probe beam 630). The controller 640 controls the imaging apparatus 16 to capture an image of the wafer 22 at each chip-bonding location.

In some embodiments, the inspection device 610 is held in a housing 644 of an inspection module 650 mounted to a bonding head (such as bonding head 540) of a bonding machine for bonding one or more semiconductor structures 24 to the wafer 22, as shown in FIG. 6. In such embodiments, the inspection device 610 is located inside the processing chamber where the bonding occurs and moves with the bonding head.

Similar to that described above for the inspection apparatus 100, the data processing system 18 in the inspection apparatus 600 receives the image data from the imaging apparatus 16 and analyzes the image data to identify distortions in the wavefront of the reflection beam 632, thereby detecting bulge defects and/or other defects in the inspection surface of the wafer 22. The data processing system 18 also displays detected defects on a user interface and classify detected defects, also as described above.

Figure 8:
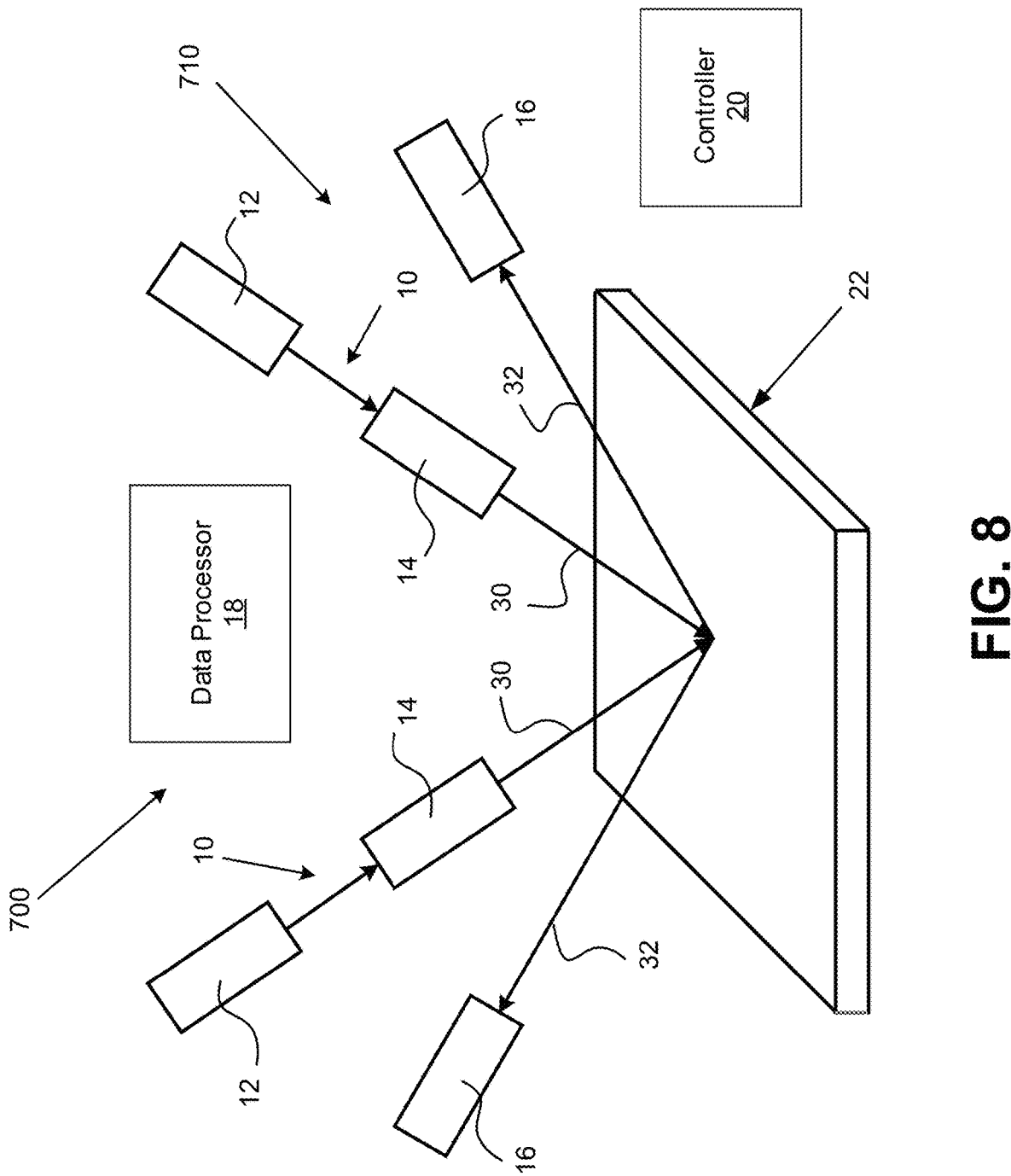
FIG. 8 shows a first illustration of a semiconductor apparatus that uses a plurality of probe beams to inspect a wafer having a semiconductor structure bonded thereto, in accordance with some embodiments.
Figure 9:
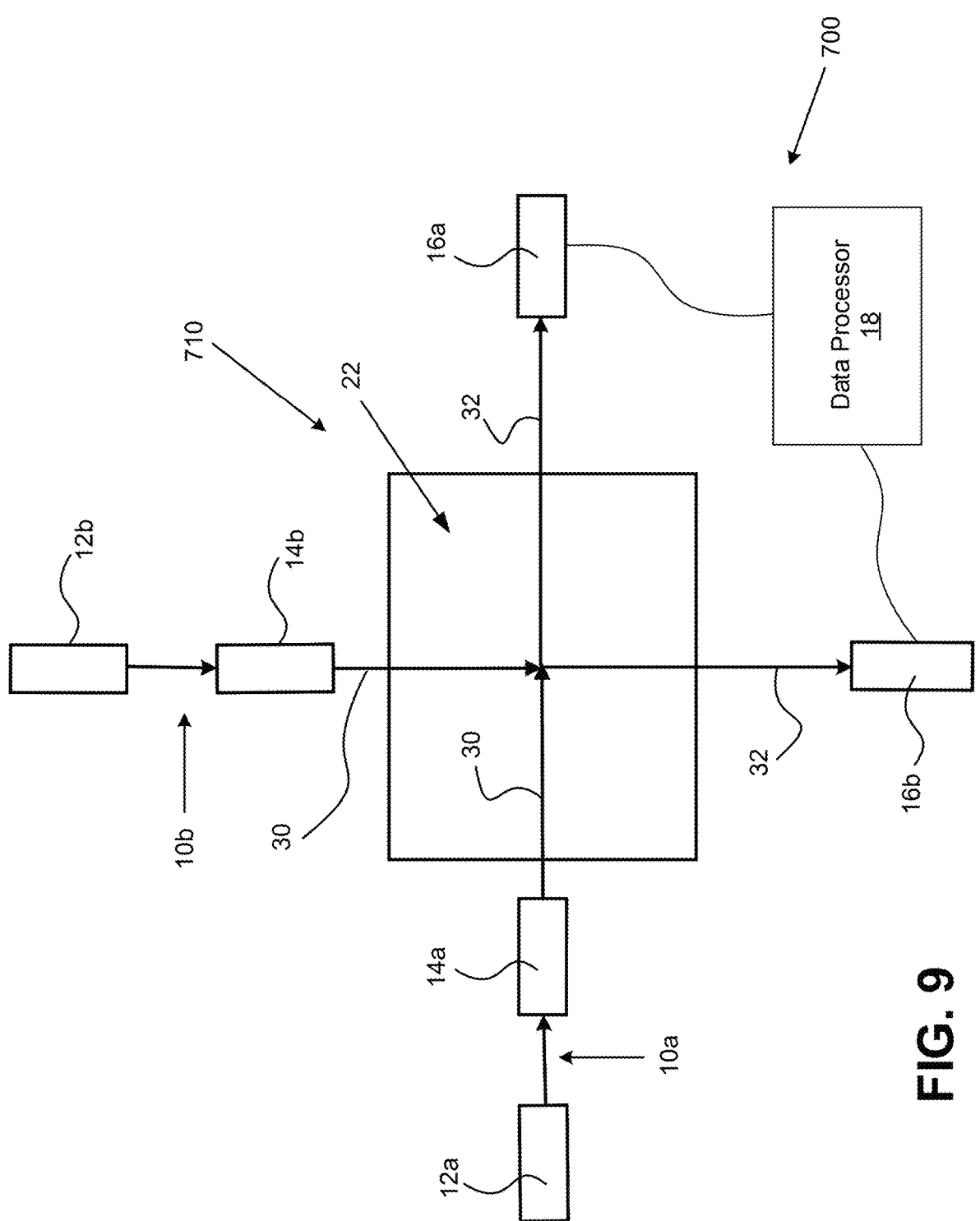
FIG. 9 shows a second illustration of the semiconductor apparatus of FIG. 8, in accordance with some embodiments.

Referring now to FIGS. 8 and 9, there is shown an inspection apparatus 700 in accordance with some embodiments. The inspection apparatus 700 includes an inspection device 710 that includes a plurality of probe beam generation devices 10 and a plurality of imaging apparatus 16. While two of each of the foregoing components are shown, it should be appreciated that more than two of each component is used in some of the embodiments. The wafer 22 with the one or more semiconductor structures 24 is fixedly or movably mounted below the inspection device 710. The inspection apparatus 700 includes the data processing system 18 and the controller 20. Other structures, devices, and configurations of the inspection apparatus 700 are within the scope of the present disclosure.

Each probe beam generation device 10 is paired with a corresponding imaging apparatus 16 form a detection subassembly. Thus, as illustrated in FIG. 9, there is a first detection subassembly that includes a probe beam generation device 10a and a corresponding imaging apparatus 16a; and a second detection subassembly that includes a probe beam generation device 10b and a corresponding imaging apparatus 16b.

In one or more detection subassemblies, the probe beam generation device 10 produces a probe beam 30 with a shaped wavefront, which is directed onto an inspection surface of the wafer 22 to produce a reflection beam 32 which forms an image in an image plane. This image is captured by a corresponding imaging apparatus 16, which is focused on the image plane. The image has a distortion pattern, indicating a bulge defect and/or other defect.

Each probe beam 30 has an angle of incidence and a direction. The angles of incidence of the probe beams 30 are the same or different; however, the directions of the probe beams 30 are different. As such, images of the inspection surface captured by the imaging apparatus 16 are from different directions and provide different information about any distortion pattern that is present in the images. This different information is used to better determine the nature of any bulge defect and/or other defect indicated by a distortion pattern.

Similar to that described above for the inspection apparatus 100, the data processing system 18 in the inspection apparatus 700 receives the image data from the imaging apparatus 16 and analyzes the image data to identify distortions in the wavefronts of the reflection beams 32, thereby detecting bulge defects and/or other defects in the inspection surface of the wafer 22. The data processing system 18 also displays detected defects on a user interface and classifies detected defects, also as described above.

Figure 10:
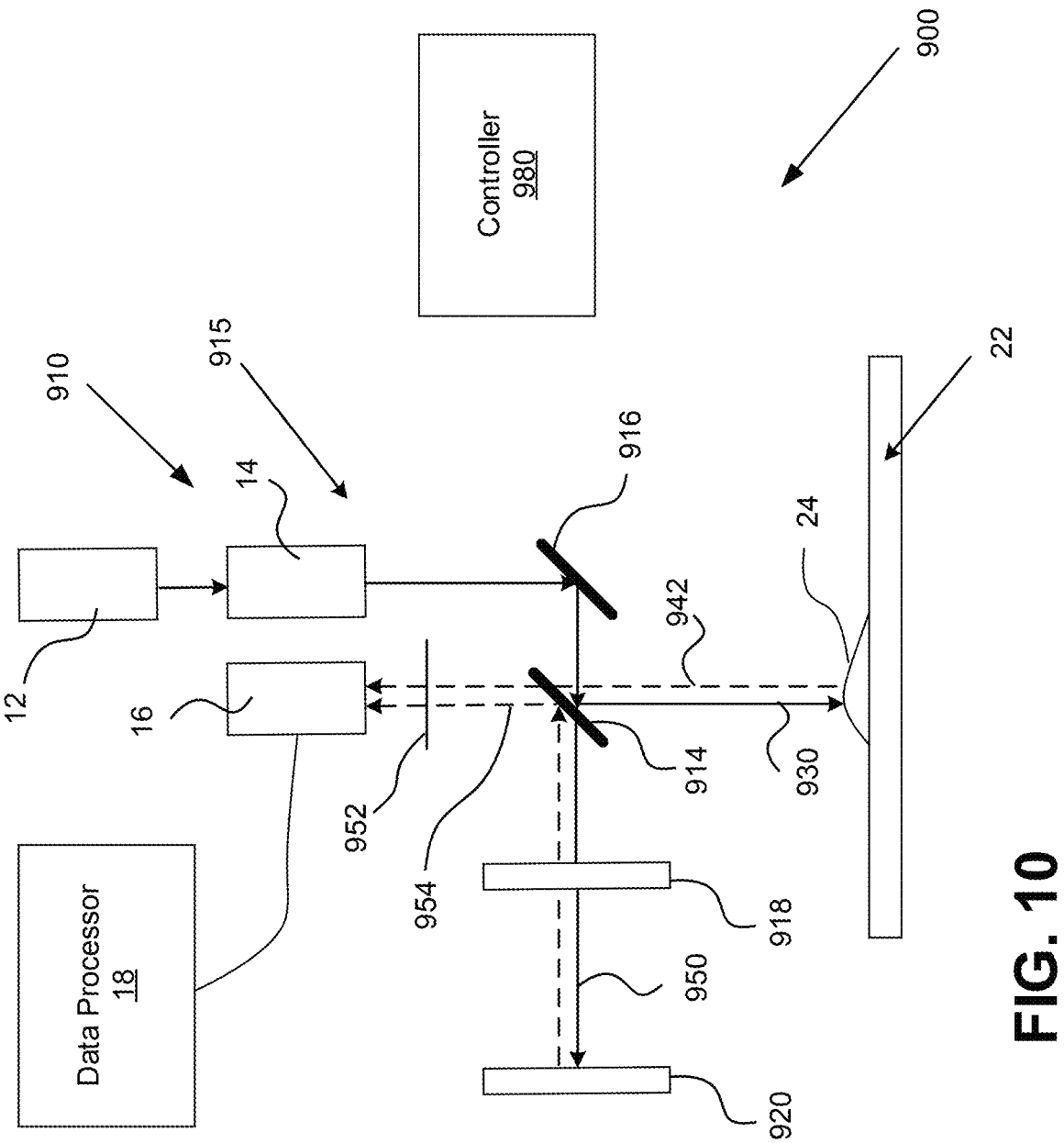
FIG. 10 shows an illustration of a semiconductor apparatus for inspecting a wafer having a semiconductor structure bonded thereto, wherein the semiconductor apparatus is operable to generate a wavefront probing image and an interferometer image of the wafer, in accordance with some embodiments.

Referring now to FIG. 10, there is shown an inspection apparatus 900 in accordance with some embodiments. The inspection apparatus 900 includes an inspection device 910 that includes a probe beam generation device 915 and the imaging apparatus 16. The probe beam generation device 915 generates a probe beam 930 and include the coherent light source 12, the wavefront shaping device 14, a beam splitter 914, a mirror 916, a shutter 918, and a reference reflector 920. The wafer 22 with the one or more semiconductor structures 24 is fixedly or movably mounted below the inspection device 910. The inspection apparatus 900 includes the data processing system 18 and a controller 980. Other structures, devices, and configurations of the inspection apparatus 900 are within the scope of the present disclosure.

As will be discussed more fully below, the inspection device 910 operates in two different modes to detect bulge defects. In a first mode, the inspection device 910 operate as a Michelson interferometer type of detector. In a second mode, the inspection device 910 operates as a wavefront-probing type of detector, similar to the inspection device 90. The inspection device 910 is moved between the first and second modes by opening and closing the shutter 918. More specifically, opening the shutter 918 places the inspection device 910 in the first mode of operation and closing the shutter 918 places the inspection device 910 in the second mode of operation.

The imaging apparatus 16 is disposed adjacent to and in close proximity to the coherent light source 12 and the wavefront shaping device 14. The beam splitter 914, the mirror 916, the shutter 918, and the reference reflector 920 are disposed below the coherent light source 12, the wavefront shaping device 14 and the imaging apparatus 16. Similar to that described above for the inspection device 512, the probe beam 930, and an optical axis of the imaging apparatus 16 is coaxial or closely parallel.

In the first mode of operation, the shutter 918 is open. The coherent light is generated by the coherent light source 12 and is conditioned by the wavefront shaping device 14 to have a shaped wavefront. The coherent light with the shaped wavefront then travels to the mirror 916, where it is redirected to the beam splitter 914. The coherent light is split by the beam splitter 914, with probe beam 30 being directed toward the inspection surface of the wafer 22 and the reference beam 950 being directed toward the shutter 918.

The probe beam 930 hits the inspection surface of the wafer 22 and is reflected back as the reflection beam 942 to the beam splitter 914. The reference beam 950 passes through the shutter 918 and hits the reference reflector 920 (such as at a right angle thereto), which reflects the reference beam 950 back through the shutter 918 to the beam splitter 914. In the beam splitter 914, the reflection beam 942 and the reference beam 950 are combined to form a combined beam 954, which forms an interferometer image in an image plane 952, with the interferometer image being captured and image data generated therefrom by the imaging apparatus 16.

In the absence of a bulge defect, the reflection beam 942 and the reference beam 950 in the combined beam 954 have substantially equal optical path lengths within a certain tolerance. As a result, the combined beam 954 produces broad fringes in a plane perpendicular to the longitudinal axis of the combined beam. One of these fringes covers a substantial portion of the interference image captured by the imaging apparatus 16, with the interior of the fringe having a constant intensity. If a bulge defect is present on the inspection surface, the bulge defect will change the optical path length of a portion of the reflection beam 942. This optical path length difference will produce a localized interference fringe pattern in the combined beam 954 and resultant interference fringes, or rings that encircle the bulge defect in the captured image of the inspection surface. The height of the bulge defect is determined from the fringes or rings in the interferometer image, such as their number size and spacing.

In the second mode of operation, the shutter 918 is closed. Coherent light is generated by the coherent light source 12 and is conditioned by the wavefront shaping device 14 to have a shaped wavefront. The coherent light with the shaped wavefront travels to the mirror 916, where it is redirected to the beam splitter 914. The coherent light with the shaped wavefront is split by the beam splitter 914, with a first portion of the coherent light being directed toward the inspection surface of the wafer 22 as the probe beam 930 and a second portion of the coherent light being directed toward the shutter 918 as a reference beam 950. The probe beam 930 hits the inspection surface and is reflected back as a reflection beam 942 with a wavefront that is distorted by a bulge defect. The reflection beam 942 travels back through the beam splitter 914 and forms a wavefront probing image in the image plane 952. The wavefront probing image is captured by the imaging apparatus 16, which generates image data therefrom. Since the shutter 918 is closed, the shutter 918 blocks the reference beam 950 from traveling to the reference reflector 920, thereby preventing the reference beam 950 from being reflected back and combined with the reflection beam 942, as in the first mode. As such, the captured wavefront probing image is clear and focused.

For each inspection surface on the wafer 22, such as a chip bonding location, the inspection device 910 takes a wavefront probing image and an interferometer image. The wavefront probing image provides information on the specific location and size (e.g., bounds) of a detected anomaly, while the interferometer image provides information on the topography (e.g., height) of the anomaly. The additional information provided by the interferometer image is used to determine if an anomaly is a bulge defect or other type of defect. The additional information is also used by the defect classification software program executed by the data processing system 18 to better classify a detected defect.

Although not shown, the inspection device 910 is mounted to an upper movable stage and/or the wafer 22 is mounted to a lower movable stage so as to enable relative movement between the inspection device 910 and the wafer 22, according to some embodiments, to permit a wavefront probing image and a corresponding interference image to be captured for a plurality of different portions of the wafer, such as chip bonding locations. Relatively comprehensive information is thus obtainable for the chip bonding locations of the entire wafer 22.

Similar to that described above for the inspection apparatus 100, the data processing system 18 in the inspection apparatus 900 receives the image data (e.g., for the wavefront probing image and the interferometer image) from the imaging apparatus 16 and analyzes the image data to identify distortions in the wavefronts of the reflection beams 32, thereby detecting bulge defects and/or other defects in the inspection surface of the wafer 22. The data processing system 18 also displays detected defects on a user interface and classify detected defects, also as described above.

In some embodiments, a controller 980 is operatively connected to the inspection device 910 to control one or more components. For example, the controller 980 controls the opening and closing of the shutter 918 in coordination with the control of the coherent light source 12 and the imaging apparatus 16 to capture a wavefront probing image and an interference image of an inspection surface on the wafer 22. Moreover, if relative movement between the inspection device 912 and the wafer 22 is enabled, the controller 980 also controls the movement(s) of the stages(s) that effect the relative movement. The controller 980 thus controls the capture of wavefront probing images and corresponding interference images for a plurality of different portions of the wafer, such as semiconductor structure 24 bonding locations, according to some embodiments.

Figure 11:
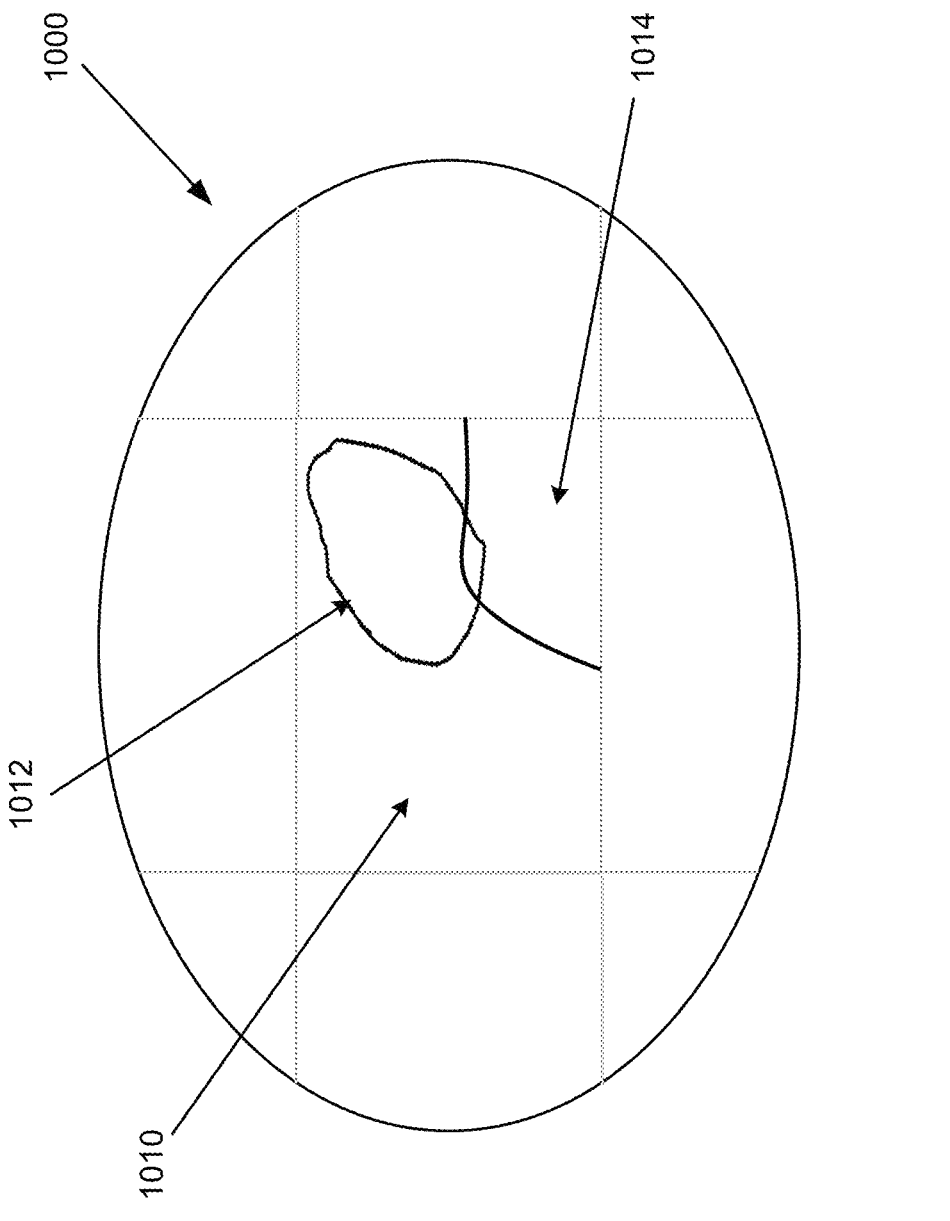
FIG. 11 shows an illustration of a wavefront probing image of a wafer.

FIG. 11 shows a wavefront probing image 1000 of a die 1010 of the wafer 22 taken by the imaging apparatus 16. Portions of a plurality of other dies are also shown. The die 1010 has a first visual anomaly 1012 and a second visual anomaly 1014, which partially overlap. The first visual anomaly 1012 and the second visual anomaly 1014 are clearly defined and, although not shown, have a darker shade than the rest of the die 1010.

Figure 12:
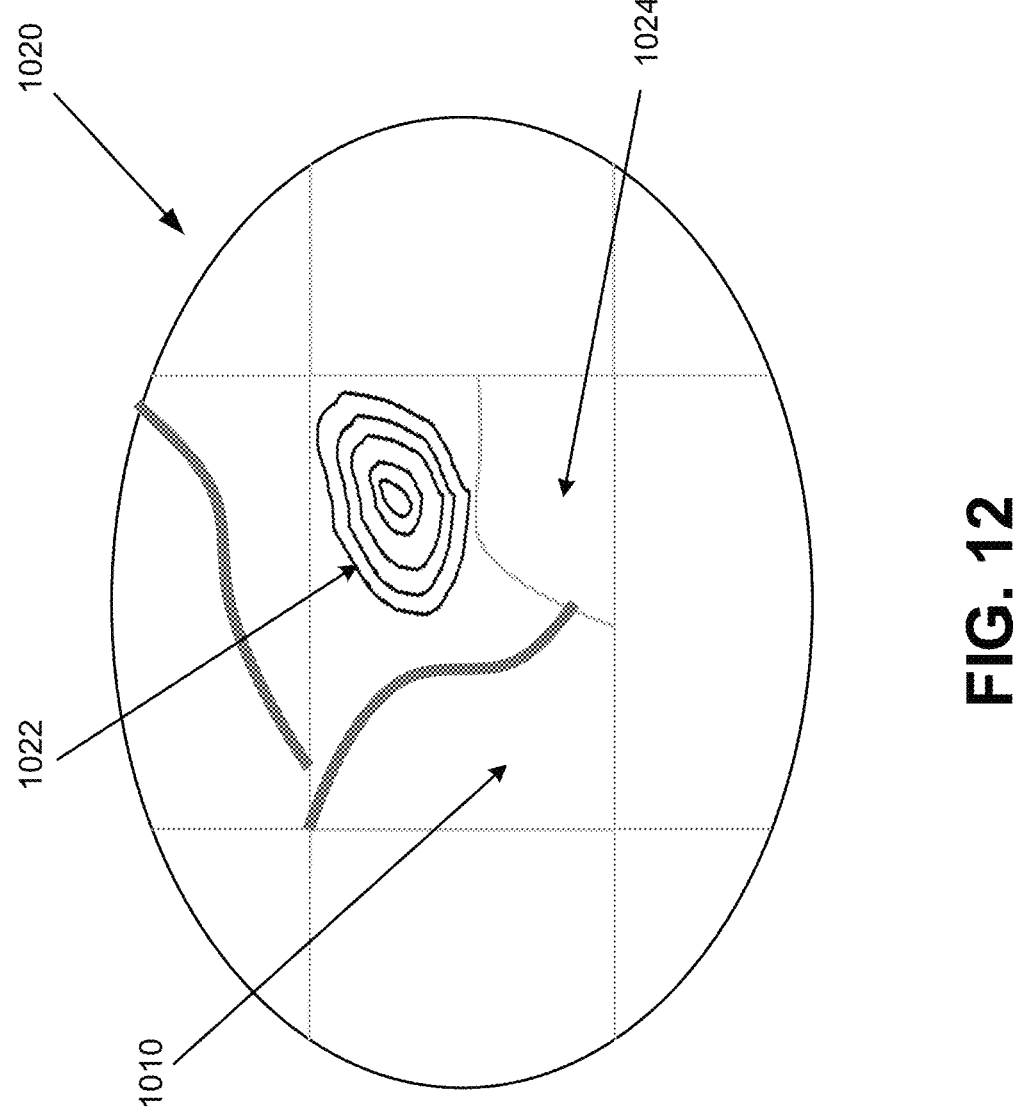
FIG. 12 shows an illustration of an interferometer image of a wafer.

FIG. 12 shows an interferometer image 1020 of the die 1010 of the wafer 22 taken by the imaging apparatus 16. Portions of a plurality of other dies are also shown. The die 1010 has a first visual anomaly 1022 and a second visual anomaly 1024, which correspond to the first visual anomaly 1012 and the second visual anomaly 1014 in the wavefront probing image 1000. The first visual anomaly 1022 has an interference ring formation, which indicates height changes in the inspection surface, such as would occur as a result of a bulge defect. The second visual anomaly 1024 does not have such a ring pattern, but has a different shade than the rest of the die 1010 (not shown).

The first visual anomaly 1012 in the wavefront probing image 1000 and the first visual anomaly 1022 in the interferometer image 1020 indicate that there is a bulge defect in the die 1010 at the location indicated by these visual anomalies. The second visual anomaly 1014 in the wavefront probing image 1000 and the second visual anomaly 1024 in the interferometer image 1020 also indicate that there is a defect at the location indicated by these visual anomalies.

A method 1200 of inspecting a wafer having a semiconductor structure bonded thereto is illustrated in FIG. 13 in accordance with some embodiments. At 1202, coherent light having a wavefront is generated. In some embodiments, the coherent light with the wavefront is generated by a laser. At 1204, the wavefront of the coherent light is shaped to provide the coherent light with a shaped wavefront. In some embodiments, the wavefront of the coherent light is shaped to form a wavefront configured to produce a planar wavefront in a reflection beam. In some embodiments, the wavefront of the coherent light is shaped to compensate for a structural protrusion on the wafer such that the shaped wavefront of the coherent light is non-planar. At 1206, a probe beam of the coherent light with the shaped wavefront is directed onto an inspection surface of the wafer where the semiconductor structure is bonded thereto, thereby causing a reflection beam to be reflected from the inspection surface of the wafer. At 1208, an image formed by the reflection beam reflected from the inspection surface of the wafer is captured and image data is generated therefrom. In some embodiments, the capturing of the image and the generating the image data is performed by a camera. At 1210, the image data is analyzed to determine whether there is a bulge defect and/or other defect in the inspection surface of the wafer.

In some embodiments, the method 1200 is performed to capture a plurality of images of the wafer, wherein the images are of different inspection surfaces of the wafer. In some embodiments, the wafer and/or the probe beam is moved along one or more axes to facilitate the capturing of the plurality of images of the wafer.

A method 1300 of inspecting a wafer having a semiconductor structure bonded thereto is illustrated in FIG. 14 in accordance with some embodiments. At 1302, coherent light having a wavefront is generated. In some embodiments, the coherent light with the wavefront is generated by a laser. At 1304, the wavefront of the coherent light is shaped to provide the coherent light with a shaped wavefront. In some embodiments, the wavefront of the coherent light is shaped to form a wavefront configured to produce a planar wavefront in a reflection beam. In some embodiments, the wavefront of the coherent light is shaped to compensate for a structural protrusion on the wafer such that the shaped wavefront of the coherent light is non-planar. At 1306, a probe beam of the coherent light with the shaped wavefront is directed onto an inspection surface of the wafer where the semiconductor structure is bonded thereto, thereby causing a reflection beam to be reflected from the inspection surface of the wafer and travel to an image plane where an image is formed. At 1308, the image is directed from the image plane to an imaging apparatus so as to travel at least partially along an optical axis of the imaging apparatus, which is coaxial with or closely parallel to the probe beam. In some embodiments, the image is directed from the image plane to the imaging apparatus by a retroreflector or a projection screen mounted in the image plane. At 1310, the image from the image plane is captured by the inspection apparatus, which generates image data from the captured image. At 1312, the image data is analyzed to determine whether there is a bulge defect and/or other defect in the inspection surface of the wafer.

Figure 15B:
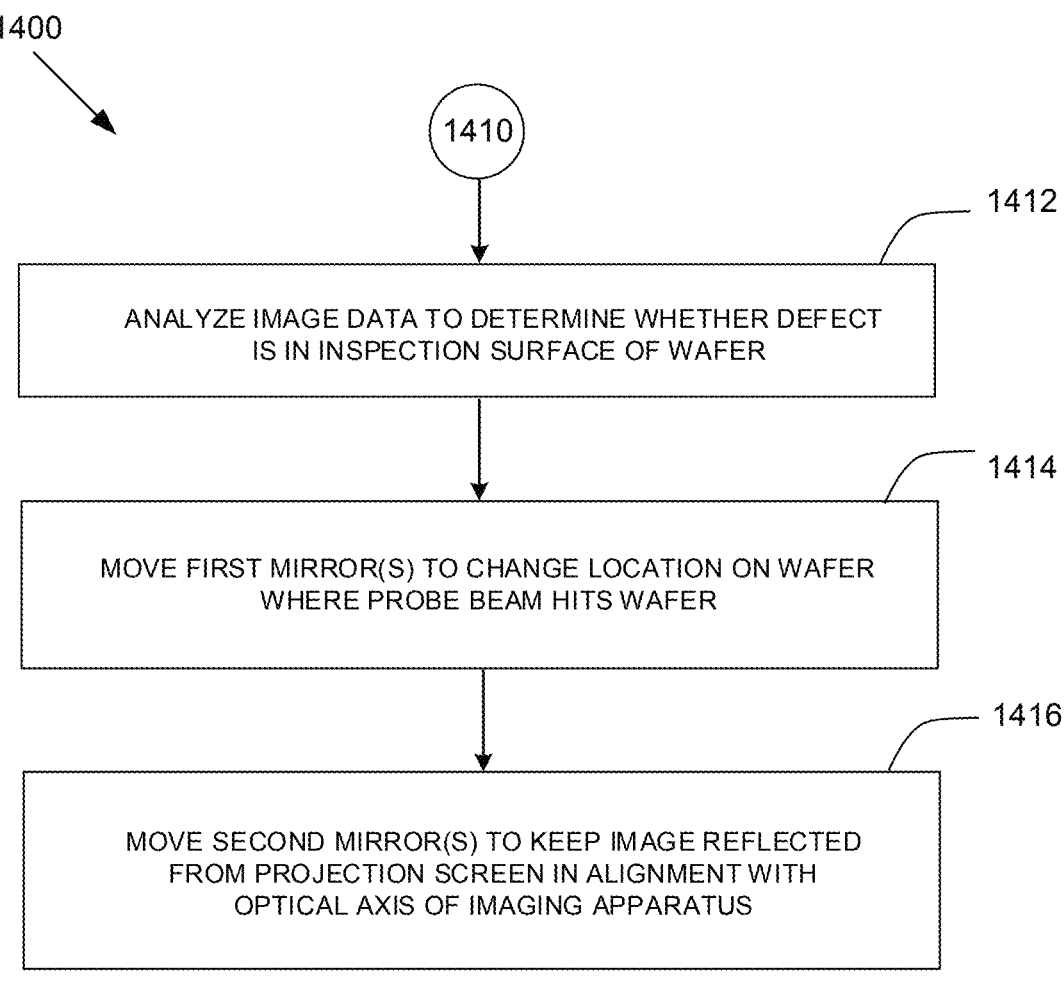
FIG. 15B shows a flow diagram illustrating a second portion of the third method of inspecting a wafer having a semiconductor structure bonded thereto, in accordance with some embodiments.

A method 1400 of inspecting a wafer having a semiconductor structure bonded thereto is illustrated in FIGS. 15A, 15B in accordance with some embodiments. At 1402, coherent light having a wavefront is generated. In some embodiments, the coherent light with the wavefront is generated by a laser. At 1404, the wavefront of the coherent light is shaped to provide the coherent light with a shaped wavefront. In some embodiments, the wavefront of the coherent light is shaped to form a wavefront configured to produce a planar wavefront in a reflection beam. In some embodiments, the wavefront of the coherent light is shaped to compensate for a structural protrusion on the wafer such that the shaped wavefront of the coherent light is non-planar. At 1406, one or more first mirrors are used to direct a probe beam of the coherent light with the shaped wavefront onto an inspection surface of the wafer where the semiconductor structure is bonded thereto, thereby causing a reflection beam to be reflected from the inspection surface of the wafer and travel to a projection screen where an image is formed. At 1408, one or more second mirrors are used to reflect the image on the projection screen to an imaging apparatus having an optical axis. At 1410, the image reflected from the projection screen is captured by the inspection apparatus, which generates image data from the captured image. At 1412, the image data is analyzed to determine whether there is a defect in the inspection surface of the wafer. At 1414, the one or more first mirrors are moved to change the location on the wafer where the probe beam hits the wafer. At 1416, the one or more second mirrors are moved to keep the image reflected from the projection screen in alignment with the optical axis of the imaging apparatus.

Figure 16:
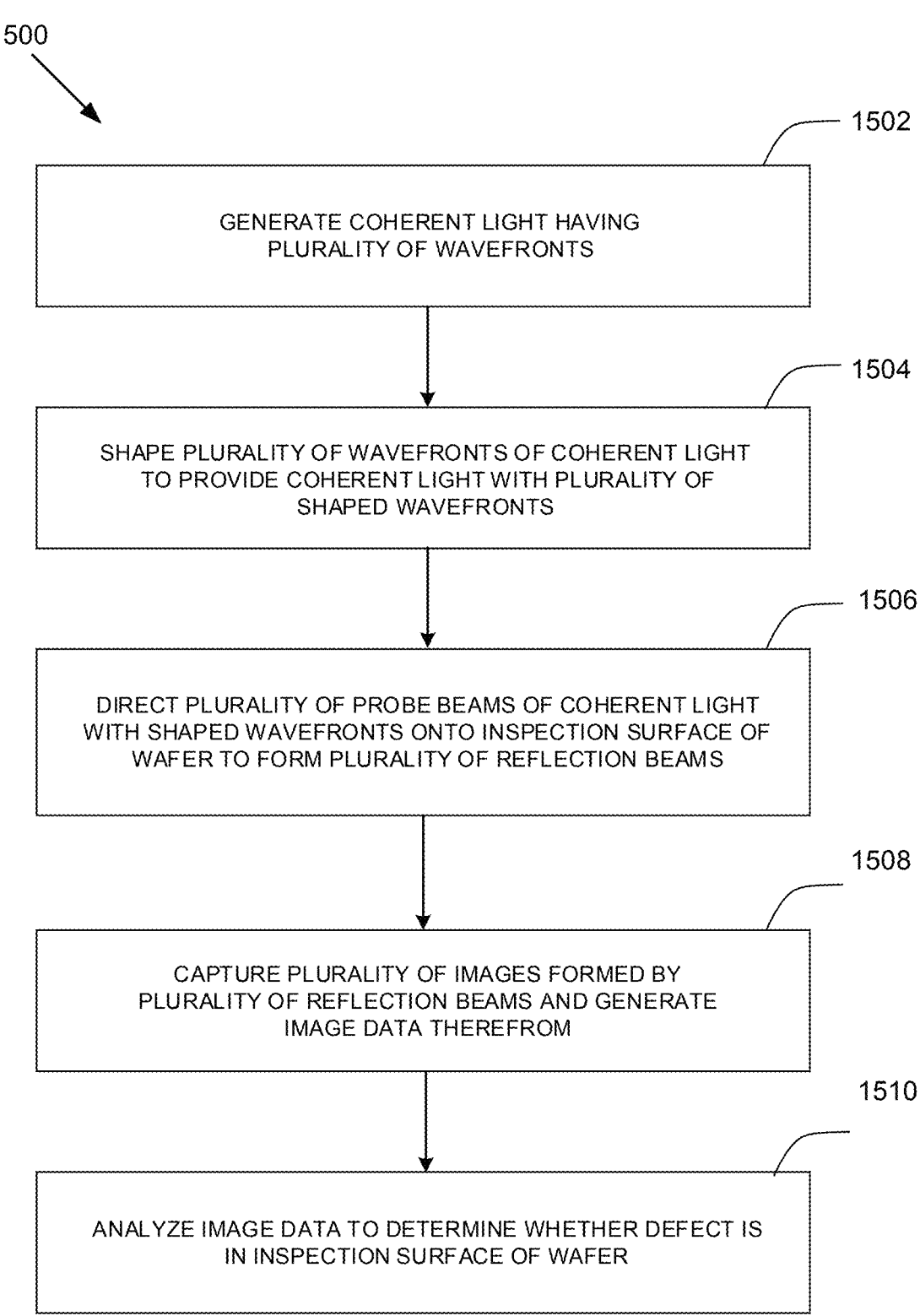
FIG. 16 shows a flow diagram illustrating a fourth method of inspecting a wafer having a semiconductor structure bonded thereto, in accordance with some embodiments.

A method 1500 of inspecting a wafer having a semiconductor structure bonded thereto is illustrated in FIG. 16 in accordance with some embodiments. At 1502, coherent light having a plurality of wavefronts is generated. In some embodiments, the coherent light with the plurality of wavefronts is generated by a plurality of lasers. At 1504, the plurality of wavefronts are shaped to form a plurality of shaped wavefronts. In some embodiments, the plurality of wavefronts of the coherent light is shaped to have the plurality of shaped wavefronts configured to produce planar wavefronts in reflection beams. In some embodiments, the plurality of wavefronts of the coherent light is shaped to compensate for a structural protrusion on the wafer such that the plurality of shaped wavefronts of the coherent light is non-planar. At 1506, a plurality of probe beams of the coherent light with the plurality of shaped wavefronts is directed onto the inspection surface of the wafer where the semiconductor structure is bonded thereto, thereby causing a plurality of reflection beams to be reflected from the inspection surface of the wafer. At 1508, a plurality of images formed by the plurality of reflection beams reflected from the inspection surface of the wafer are captured and image data from the plurality of images is generated. The plurality of images comprises images of the inspection surface of the wafer from different directions, respectively. At 1510, the image data generated from the plurality of images is analyzed to determine whether there is a bulge defect and/or defect in the inspection surface of the wafer.

Figure 17B:
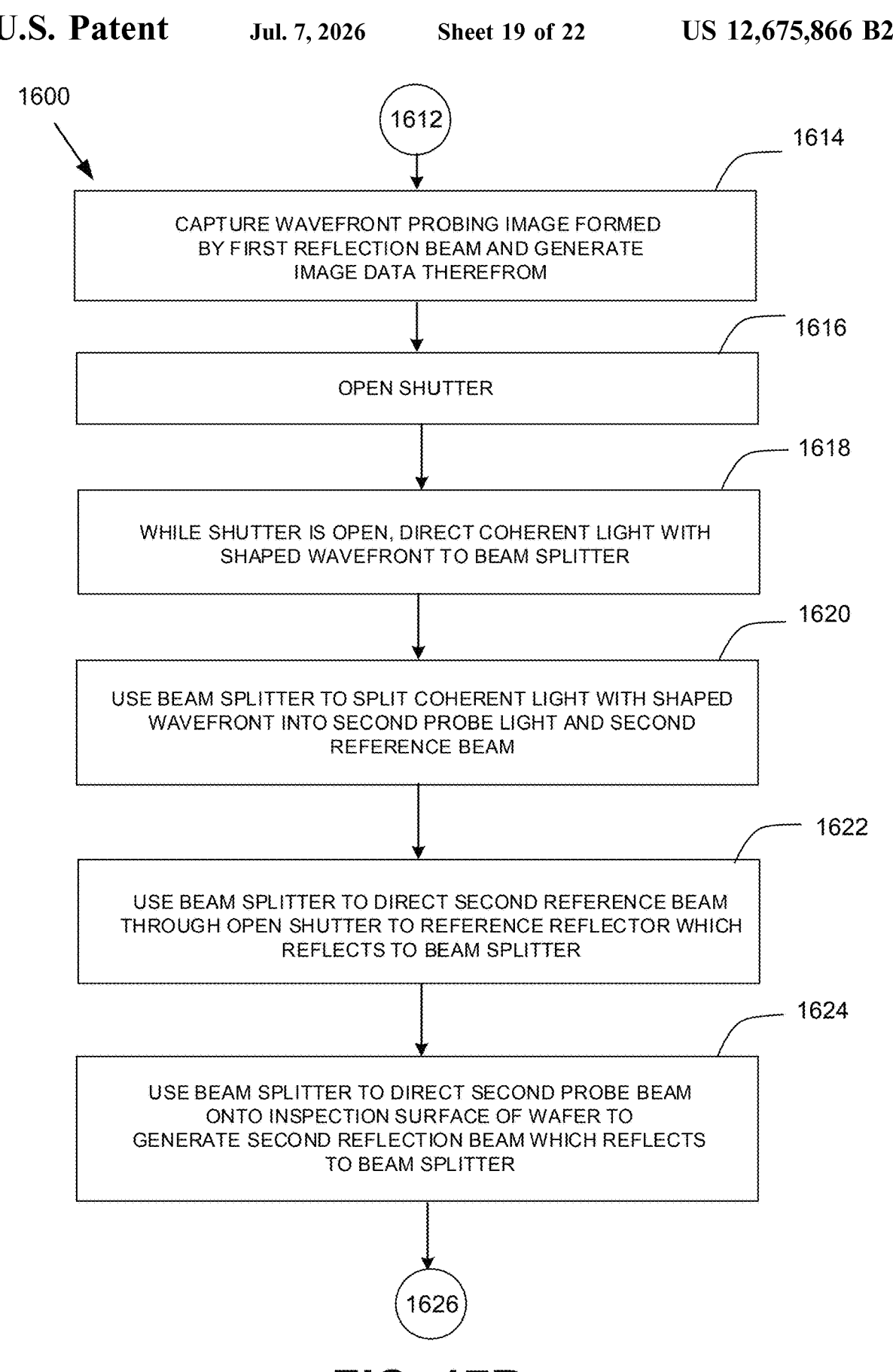
FIG. 17B shows a flow diagram illustrating a second portion of the fifth method of inspecting a wafer having a semiconductor structure bonded thereto, in accordance with some embodiments.

A method 1600 of inspecting a wafer having a semiconductor structure bonded thereto is illustrated in FIG. 17 in accordance with some embodiments. At 1602, coherent light having a wavefront is generated. In some embodiments, the coherent light with the wavefront is generated by a laser. At 1604, the wavefront of the coherent light is shaped to provide the coherent light with a shaped wavefront. At 1606, while a shutter is closed, the coherent light with the shaped wavefront is directed to a beam splitter. At 1608, the beam splitter is used to split the coherent light with the shaped wavefront into a first probe beam and a first reference beam. At 1610, the beam splitter is used to direct the first reference beam to the closed shutter, which blocks the first reference beam. At 1612, the beam splitter is used to direct the first probe beam onto an inspection surface of the wafer, thereby causing a first reflection beam to be reflected from the inspection surface of the wafer and travel to an image plane where it forms a wavefront probing image. At 1614, the wavefront probing image is captured and image data is generated therefrom. At 1616, the shutter is opened. At 1618, while the shutter is open, the coherent light with the shaped wavefront is directed to the beam splitter. At 1620, the beam splitter is used to split the coherent light with the shaped wavefront into a second probe beam and a second reference beam. At 1622, the beam splitter is used to direct the second reference beam through the open shutter to hit a reference reflector and be reflected back to the beam splitter. At 1624, the beam splitter is used to direct the second probe beam onto an inspection surface of the wafer, thereby causing a second reflection beam to be reflected from the inspection surface of the wafer and travel to the beam splitter. At 1626, the beam splitter is used to combine the second reference beam with the second reflection beam to form a combined beam. At 1628, the beam splitter is used to direct the combined beam to the image plane where it forms an interferometer image. At 1630, the interferometer image is captured and image data is generated therefrom. At 1632, the image data from the wavefront probing image and the interferometer image is analyzed to determine whether there is a bulge defect and/or other defect in the inspection surface of the wafer.

Figure 18:
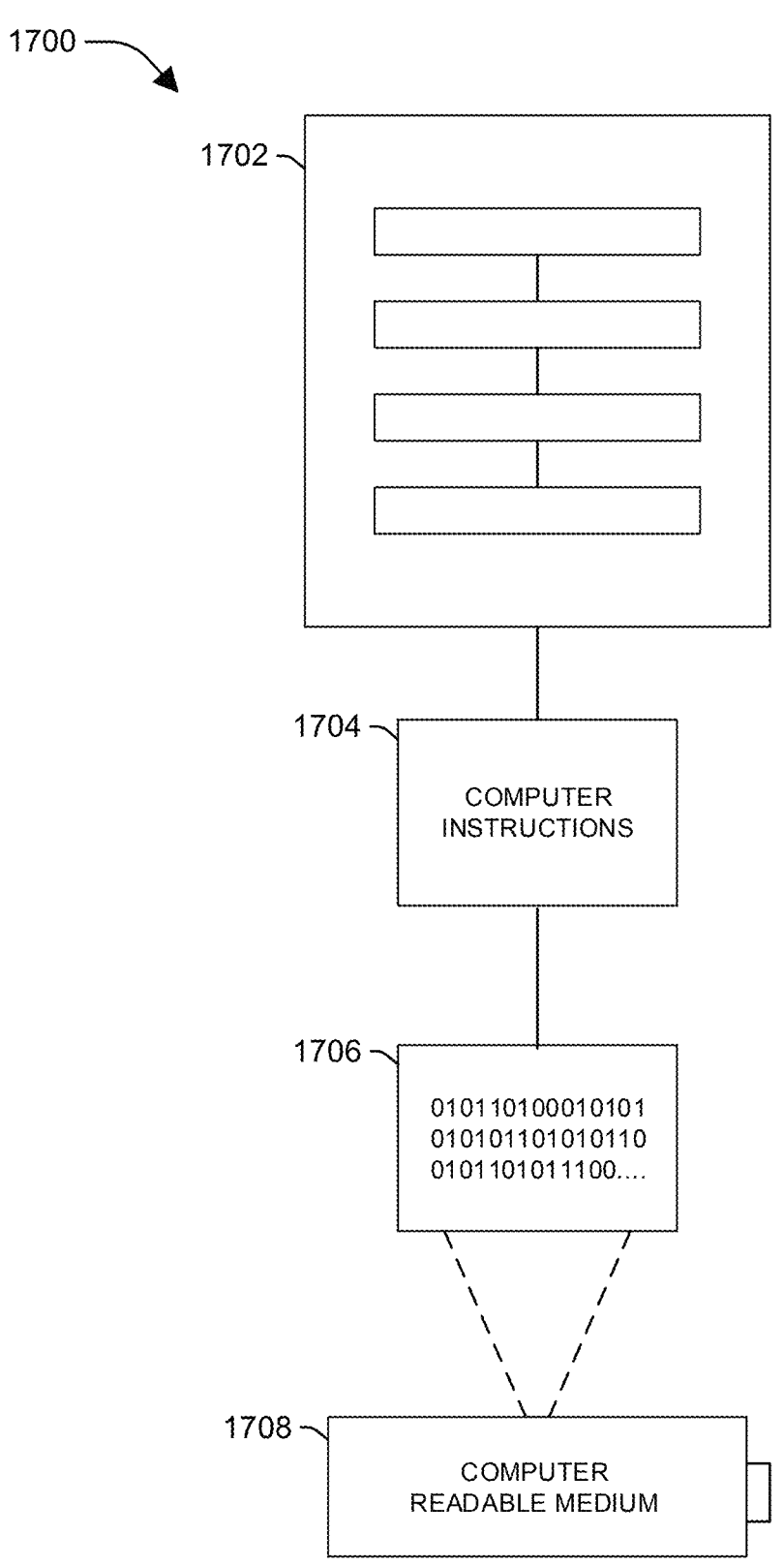
FIG. 18 illustrates an example computer-readable medium wherein processor-executable instructions configured to embody one or more of the provisions set forth herein may be comprised, according to some embodiments.

One or more embodiments may involve a computer-readable medium comprising processor-executable instructions configured to implement one or more of the techniques presented herein. An exemplary computer-readable medium is illustrated in FIG. 18, wherein the embodiment 1700 comprises a computer-readable medium 1708 (e.g., a CD-R, DVD-R, flash drive, a platter of a hard disk drive, etc.), on which is encoded computer-readable data 1706. This computer-readable data 1706 in turn comprises a set of processor-executable computer instructions 1704 configured to operate according to one or more of the principles set forth herein. In some embodiments 1700, the processor-executable computer instructions 1704 are configured to perform a method 1702, such as at least some of the aforementioned method(s) or portions thereof. In some embodiments, the processor-executable computer instructions 1704 are configured to implement a system, such as at least some of the one or more aforementioned system(s). Many such computer-readable media may be devised by those of ordinary skill in the art that are configured to operate in accordance with the techniques presented herein.

Figure 19:
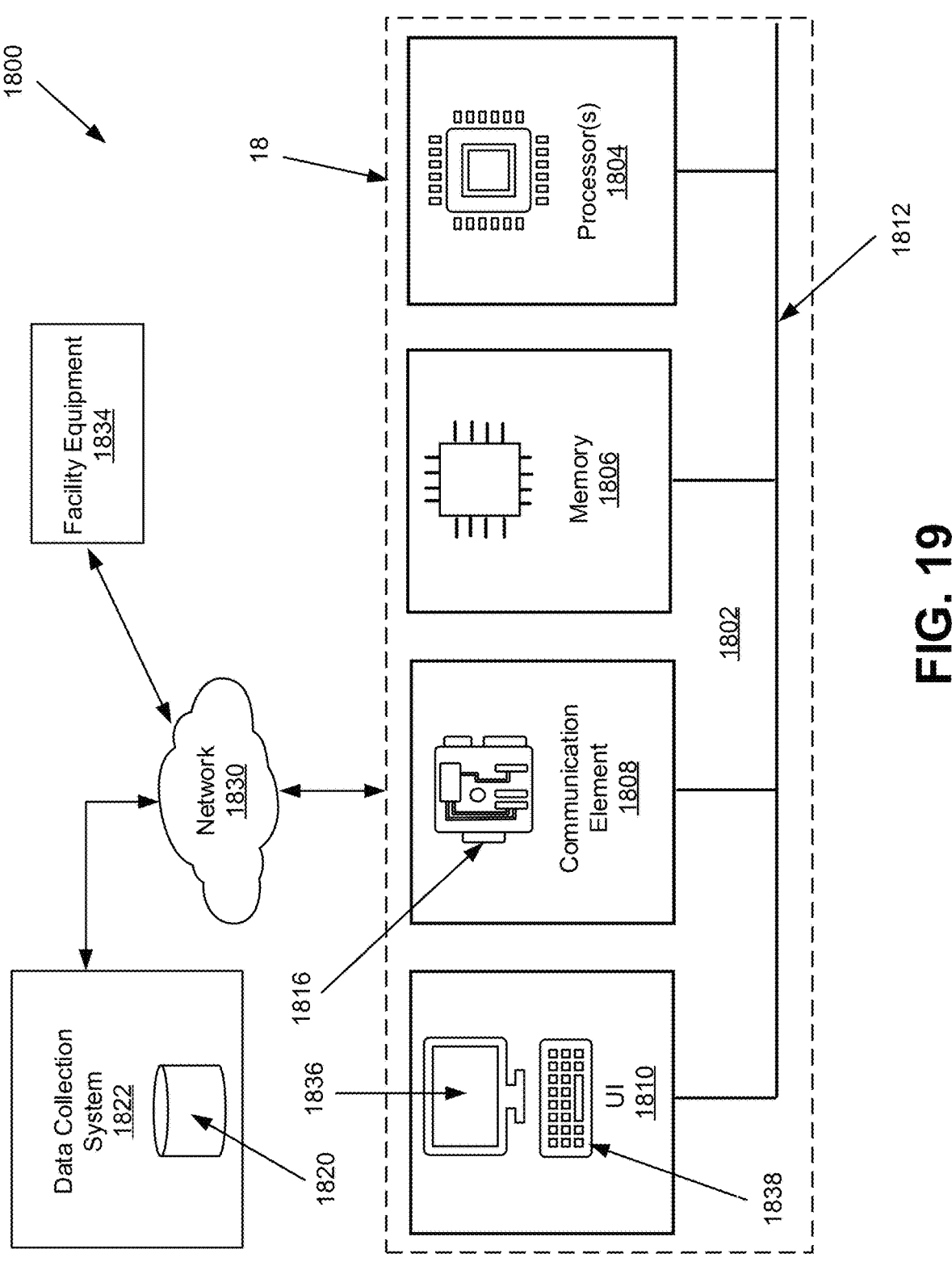
FIG. 19 illustrates an example environment in which systems and/or methods described herein may be implemented, in accordance with some embodiments.

FIG. 19 shows an example environment 1800 in which systems and/or methods described herein may be implemented. The environment 1800 includes the data processing system 18, which may include a computing device 1802. The computing device 1802 may include one or more processors 1804, memory 1806, a communication element 1808, and a user interface (UI) 1810, all of which may be connected together by a bus 1812. The processor(s) 1804 may include multiple processors arranged into processing units, such as a central processing unit (CPU) and a graphics processing unit (GPU). The processor(s) 1804 may execute instructions stored in a machine-readable, non-transitory medium, such as memory 1806.

Memory 1806 may include long-term memory, short-term memory, cache, and/or a data storage unit. Memory 1806 may store data, such as image data gathered from the imaging apparatus 16 of inspection devices 90, 512, 610, 710, 910, and instructions, such as instructions for performing all or a portion of the methods described herein, such as methods performed by a machine vision software program to analyze image data to identify distortions in wavefronts of reflection beams to detect bulge defects in wafers, or methods for classifying detected defects.

The communication element 1808 enables the computing device 1802 to communicate with other devices through a wired connection, a fiber optic connection, and/or a wireless connection. Such other devices may include the imaging apparatus 16 and other components of inspection devices 90, 512, 610, 710, 910, as well as the controllers 20, 560, 640, 980 and other facility equipment and devices. The communication element 1808 may include a wireless transceiver, a fiber optic transceiver, a cable transceiver, and a network interface 1816 for accessing a network 1830. The communication element 1808 may include an antenna for wireless communication.

Using the communication element 1808 (e.g., network interface 1816), the computing device 1802 may access data stored in a data repository 1820 of a data collection system 1822 connected to the network 1830. The data collection system 1822 may automatically collect and store historical data (such as image data) from inspection apparatus (e.g., inspection apparatus 100-900) located throughout a facility, such as an industrial facility in which semiconductor devices are fabricated. Such historical data may be used to build and maintain a library for use in a defect-classifying method performed by the computing device 1802.

Facility equipment 1834 may also be connected to the network 1830 and may be in communication with the computing device 1802.

The user interface 1810 enables the computing device 1802 to receive input from a user and to provide output to a user. For example, the user interface 1810 may include a display screen 1836 upon which a user may view image data from inspection devices, such as the wavefront probing image 1000 and the interferometer image 1020 described above. The user interface 1810 may include a keyboard 1838, keypad, touch screen, and/or a microphone to input information from a user.

In another example environment (not shown), the computing device 1802 may be used in a cloud computing system within which the data processing system 18 may execute. The cloud computing system may, in addition to the computing device 1802, may include a resource management component and a host operating system (OS). The cloud computing system may, by way of example, execute on an Amazon Web Services platform, a Microsoft Azure platform, or a Google Cloud Platform. The resource management component may perform virtualization of the computing device 1802 to create a plurality of virtual computing systems, thereby permitting the computing device 1802 to operate more efficiently, with lower power consumption, higher reliability, higher utilization, and greater flexibility.

In some embodiments, an inspection apparatus is provided. The inspection apparatus includes a probe beam generation device configured to emit a probe beam to an inspection surface of a wafer to cause a reflection beam to be reflected from the inspection surface. The probe beam generation device includes a coherent light source configured to generate coherent light with a wavefront and a wavefront shaping device configured to shape the wavefront of the coherent light to provide the coherent light with a shaped wavefront. The probe beam includes the coherent light with the shaped wavefront. The inspection apparatus includes an imaging apparatus configured to capture an image formed from the reflection beam and to generate image data related to the image. The inspection apparatus includes a data processing system configured to analyze the image data from the imaging apparatus to determine whether there is a defect in the inspection surface of the wafer.

In some embodiments, an inspection apparatus is provided. The inspection apparatus includes a coherent light source configured to generate coherent light with a wavefront. The inspection apparatus includes a wavefront shaping device configured to shape a wavefront of the coherent light to provide the coherent light with a shaped wavefront. The inspection apparatus includes a reference reflector. The inspection apparatus includes a shutter configured to be movable between an open position and a closed position. The inspection apparatus includes a beam splitter disposed such that the shutter is positioned between the beam splitter and the reference reflector, the beam splitter being configured to receive the coherent light with the shaped wavefront and to split the coherent light into a probe beam and a reference beam, with the reference beam being directed to the shutter and the probe beam being directed to an inspection surface of a wafer to cause a reflection beam to be reflected from the inspection surface. The inspection apparatus includes an imaging apparatus configured to capture images in an image plane and to generate image data related to the images. The inspection apparatus includes a data processing system configured to analyze the image data to determine whether there is a defect in the inspection surface of the wafer. In a first mode of operation, the shutter is in the open position such that the reference beam passes through the shutter, hits the reference reflector, is reflected back through the shutter to the beam splitter, and is combined with the reflection beam to form a combined beam, and the combined beam is directed to the image plane where an interferometer image is formed. In a second mode of operation, the shutter is in the closed position such that the reference beam does not pass through the shutter, and the reflection beam is directed to the image plane where a wavefront probing image is formed. The images captured by the imaging apparatus include the wavefront probing image and the interferometer image.

In some embodiments, a method is provided. The method includes generating coherent light that has a wavefront, shaping the wavefront of the coherent light to provide the coherent light with a shaped wavefront, directing a probe beam of the coherent light with the shaped wavefront to an inspection surface of a wafer, causing a reflection beam to be reflected from the inspection surface of the wafer, capturing an image formed from the reflection beam reflected from the inspection surface of the wafer and generating image data related to the image, and analyzing the image data to determine whether there is a defect in the inspection surface of the wafer.

According to some embodiments, at least one of the one or more layers, features, structures, elements, etc. disclosed herein are in direct contact with another of the one or more layers, features, structures, elements, etc. disclosed herein. According to some embodiments, at least one of the one or more layers, features, structures, elements, etc. disclosed herein are not in direct contact with another of the one or more layers, features, structures, elements, etc. disclosed herein, such as where one or more intervening, separating, etc. layers, features, structures, elements, etc. exist.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An inspection apparatus, comprising:
a probe beam generation device configured to emit a probe beam to an inspection surface of a wafer to cause a reflection beam to be reflected from the inspection surface, wherein:
the probe beam generation device comprises:
a coherent light source configured to generate coherent light with a wavefront;
a wavefront shaping device configured to shape the wavefront of the coherent light to provide the coherent light with a shaped wavefront; and
a first mirror configured to direct the probe beam onto the inspection surface of the wafer, the first mirror being movable to change a location on the wafer where the probe beam hits the wafer, and
the probe beam comprises the coherent light with the shaped wavefront;
a projection screen configured to display an image formed from the reflection beam;
a second mirror configured to reflect the image on the projection screen to an imaging apparatus, the second mirror being movable to keep the image on the projection screen in alignment with an optical axis of the imaging apparatus when the first mirror is moved;
the imaging apparatus configured to capture the image formed from the reflection beam and to generate image data related to the image; and
a data processing system configured to analyze the image data from the imaging apparatus to determine whether there is a defect in the inspection surface of the wafer.

21 22

2. The inspection apparatus of claim 1, wherein the shaped wavefront of the coherent light is configured such that the reflection beam comprises a planar wavefront in the absence of the defect and the image data comprises a distortion in the presence of the defect as a function of the planar wavefront being distorted by the defect, wherein the data processing system is configured to determine whether the defect is in the inspection surface by analyzing the image data to detect the distortion.

3. The inspection apparatus of claim 1, wherein the shaped wavefront of the coherent light is configured to compensate for a structural protrusion on the wafer.

4. The inspection apparatus of claim 1, wherein the imaging apparatus comprises a camera, and wherein the coherent light source comprises a laser.

5. The inspection apparatus of claim 1, wherein the imaging apparatus is configured to capture a plurality of images of different inspection surfaces of the wafer.

6. The inspection apparatus of claim 5, comprising:

a stage for holding the wafer, the stage being configured to move along one or more axes to facilitate the capture of the plurality of images of different inspection surfaces of the wafer.

7. The inspection apparatus of claim 5, comprising:

an inspection module comprising a housing that holds the probe beam generation device and the imaging apparatus, the inspection module being configured to move along one or more axes to facilitate the capture of the plurality of images of different inspection surfaces of the wafer.

8. The inspection apparatus of claim 1, wherein the reflection beam travels from the inspection surface of the wafer to an image plane, and the inspection apparatus comprises:

a light panel mounted in the image plane and upon which the image is formed, the light panel being configured to direct the image onto a path to the imaging apparatus, wherein:

the path extends along the optical axis of the imaging apparatus;

the probe beam is non-perpendicular to the optical axis of the imaging apparatus; and the light panel comprises the projection screen.

9. The inspection apparatus of claim 1, comprising:

a second probe beam generation device configured to emit a second probe beam to the inspection surface of the wafer to cause a second reflection beam to be reflected from the inspection surface, the second probe beam generation device comprising a second coherent light source configured to generate second coherent light with a second wavefront and a second wavefront shaping device configured to shape the second wavefront of the second coherent light to provide the second coherent light with a second shaped wavefront, the second probe beam comprising the second coherent light with the second shaped wavefront, the probe beam generation device configured to emit the probe beam at a first angle relative to the inspection surface of the wafer, and the second probe beam generation device configured to emit the second probe beam at a second angle relative to the inspection surface of the wafer different than the first angle; and a second imaging apparatus configured to capture a second image formed from the second reflection beam and to generate second image data related to the second image, wherein the data processing system is configured to analyze the second image data from the second imaging apparatus to determine whether the defect is in the inspection surface of the wafer.

10. A method, comprising:

generating coherent light that has a wavefront;

shaping the wavefront of the coherent light to provide the coherent light with a shaped wavefront;

directing a probe beam of the coherent light with the shaped wavefront to an inspection surface of a wafer, causing a reflection beam to be reflected from the inspection surface of the wafer, wherein directing the probe beam of the coherent light with the shaped wavefront to the inspection surface of the wafer comprises using a first mirror to direct the probe beam to the inspection surface of the wafer;

capturing an image formed from the reflection beam reflected from the inspection surface of the wafer and generating image data related to the image, wherein capturing the image comprises moving a second mirror, used in capturing the image, as a function of movement of the first mirror; and analyzing the image data to determine whether there is a defect in the inspection surface of the wafer.

11. The method of claim 10, wherein shaping the wavefront of the coherent light comprises shaping the wavefront such that the reflection beam comprises a planar wavefront in the absence of the defect and the image data comprises a distortion in the presence of the defect as a function of the planar wavefront being distorted by the defect.

12. The method of claim 11, wherein analyzing the image data to determine whether the defect is in the inspection surface comprises analyzing the image data to detect the distortion.

13. The method of claim 10, wherein shaping the wavefront of the coherent light comprises shaping the wavefront such that the shaped wavefront of the coherent light is configured to compensate for a structural protrusion on the wafer.

14. The method of claim 10, wherein generating the coherent light comprises using a laser to generate the coherent light.

15. The method of claim 10, wherein capturing the image comprises using a camera to capture the image.

16. A method, comprising:

generating coherent light that has a wavefront;

shaping the wavefront of the coherent light to provide the coherent light with a shaped wavefront;

directing a probe beam of the coherent light with the shaped wavefront to an inspection surface of a wafer, causing a reflection beam to be reflected from the inspection surface of the wafer, wherein directing the probe beam of the coherent light with the shaped wavefront to the inspection surface of the wafer comprises using a first mirror to direct the probe beam to the inspection surface of the wafer;

displaying an image formed from the reflection beam on a projection screen;

moving a second mirror, used in capturing the image after being reflected from the projection screen, as a function of movement of the first mirror;

generating image data related to the image captured after being reflected from the projection screen; and analyzing the image data to determine whether there is a defect in the inspection surface of the wafer.

17. The method of claim 16, wherein shaping the wavefront of the coherent light comprises shaping the wavefront such that the reflection beam comprises a planar wavefront in the absence of the defect and the image data comprises a distortion in the presence of the defect as a function of the planar wavefront being distorted by the defect.

18. The method of claim 17, wherein analyzing the image data to determine whether the defect is in the inspection surface comprises analyzing the image data to detect the distortion.

19. The method of claim 16, wherein shaping the wavefront of the coherent light comprises shaping the wavefront such that the shaped wavefront of the coherent light is configured to compensate for a structural protrusion on the wafer.

20. The method of claim 16, wherein generating the coherent light comprises using a laser to generate the coherent light.

* * * * *